(12) United States Patent
Norwalk et al.

(10) Patent No.: US 9,652,050 B2
(45) Date of Patent: May 16, 2017

(54) ADJUSTABLE ERGONOMIC KEYBOARD

(71) Applicant: Key Ovation, LLC, Cedar Park, TX (US)

(72) Inventors: Mark Norwalk, Austin, TX (US); Chris Linegar, Sydney (AU)

(73) Assignee: Key Ovation, LLC, Cedar Park, TX (US)

( * ) Notice: Subject to any disclaimer, the term of this patent is extended or adjusted under 35 U.S.C. 154(b) by 43 days.

(21) Appl. No.: 14/191,198

(22) Filed: Feb. 26, 2014

(65) Prior Publication Data

US 2014/0240238 A1 Aug. 28, 2014

Related U.S. Application Data

(63) Continuation-in-part of application No. 14/156,922, filed on Jan. 16, 2014.

(60) Provisional application No. 61/770,035, filed on Feb. 27, 2013, provisional application No. 61/829,040, filed on May 30, 2013.

(51) Int. Cl.
*G06F 3/02* (2006.01)

(52) U.S. Cl.
CPC .......... *G06F 3/0216* (2013.01); *G06F 3/0202* (2013.01); *G06F 3/0221* (2013.01)

(58) Field of Classification Search
CPC .............. G06F 3/0202; G06F 3/02; B41J 5/10
See application file for complete search history.

(56) References Cited

U.S. PATENT DOCUMENTS 6,005,496 A * 12/1999 Hargreaves et al. ........... 341/22
2013/0321277 A1* 12/2013 Ha ............................. G06F 3/02
345/168

* cited by examiner

*Primary Examiner* — Tony N Ngo
(74) *Attorney, Agent, or Firm* — Dykema Gossett PLLC

(57) ABSTRACT

An input system includes at least one base portion. A plurality of multi-function keys, a function lock key, and a function activation key are located on the at least one base portion and coupled to a key function engine. The key function engine is configured to provide the plurality of multi-function keys in a first function mode. The key function engine may then change the function mode of the plurality of multi-function keys from the first function mode to a second function mode in response to receiving a first input through the function activation key that is followed by a second input that is received through the function lock key. The key function engine may then change the function mode of the plurality of multi-function keys between the second function mode and the first function mode in response to each subsequent input that is received through the function activation key.

20 Claims, 37 Drawing Sheets

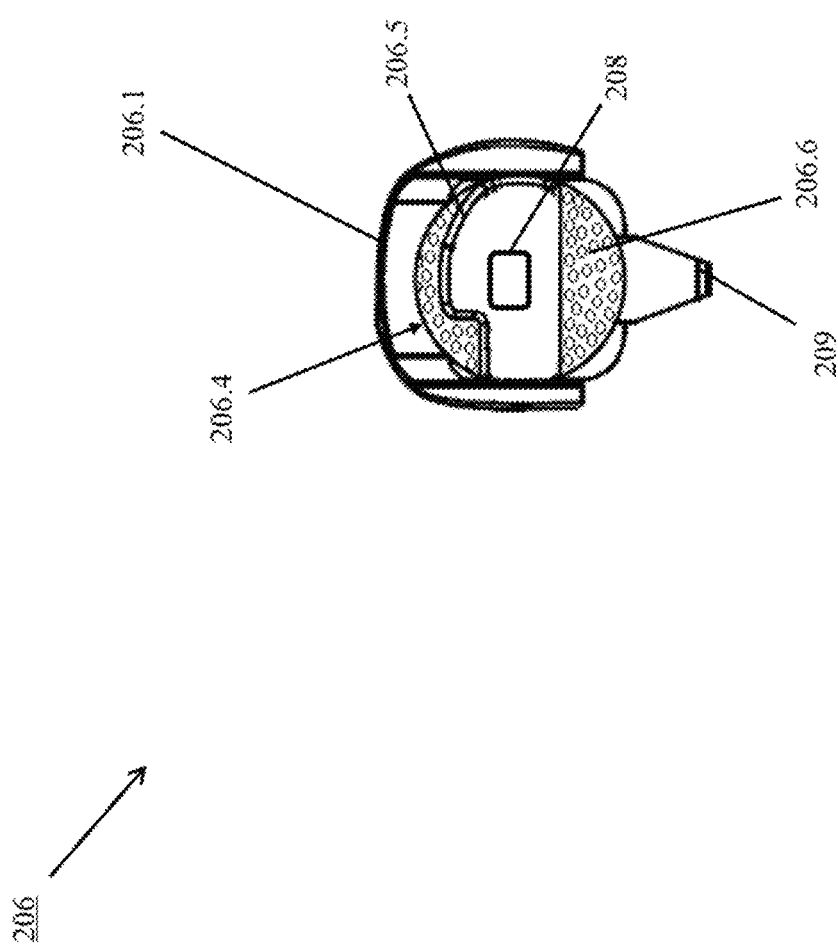

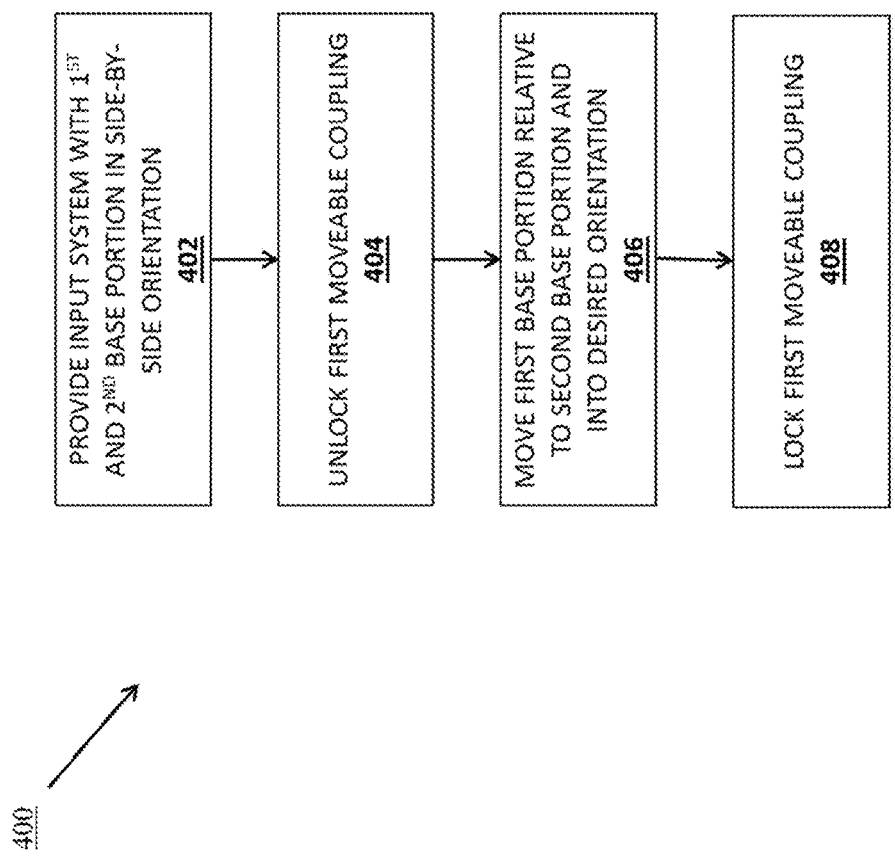

ADJUSTABLE ERGONOMIC KEYBOARD

CROSS REFERENCE TO RELATED APPLICATIONS

The present patent application claims priority to U.S. Provisional Patent Application No. 61/770,035, filed on Feb. 27, 2013, and U.S. Provisional Patent Application No. 61/829,040, filed on May 30, 2013, the entire disclosures of which are incorporated herein by reference. The present patent application is also a continuation-in-part of U.S. patent application Ser. No. 14/156,922, filed Jan. 16, 2014, which claims priority to U.S. Provisional Patent Application No. 61/770,035, filed on Feb. 27, 2013, and U.S. Provisional Patent Application No. 61/829,040, filed on May 30, 2013, the entire disclosure of which is incorporated herein by reference.

BACKGROUND

The present disclosure relates generally to computer input systems, in some embodiments to a keyboard that may be adjusted to provide the keyboard in a variety of ergonomic orientations, and in some embodiments to additionally provide the keyboard in a compact, folded-over configuration for stowing and transport.

Keyboards of the type used at computer terminals conventionally include a unitary board onto which alphanumeric keys are attached. It is often a disadvantage of such conventional keyboards that the wrists and/or arms and shoulders of a human user must be contorted into a configuration which may be stressful, particularly after prolonged use of the keyboard. This problem is brought about by the fact that, in most conventional unitary keyboard designs and key arrangements, the hands of the user must be turned outwardly by pivoting of the wrists relative to the forearms, resulting in ulnar deviation. Discomfort to the user caused by pronation of the wrists is also a problem with these conventional keyboards. Pronated postures can also transmit stresses into the neck and shoulders of the user.

It is generally desirable to reduce pronation and ulnar deviation of the wrists in computer keyboards. To that end, U.S. Pat. No. 6,984,081 describes adjustable keyboards with at least two keyboard segments which are movable relative to one another via a hinge or joint, along with a locking lever that is operable to lock the keyboard segments into a desired ergonomic orientation. The user may de-actuate the locking lever to release the keyboard segments for movement relative to each other, adjust the keyboard segments into a desired ergonomic orientation, and then actuate the locking lever to lock the keyboard segments into the desired ergonomic orientation. This allows the orientation of the user's wrists and hands to be precisely adjusted to allow for reduction of ulnar deviation and pronation of the wrists. Successful commercial embodiments generally in accord with such a design include the Goldtouch® adjustable keyboard and the Goldtouch Go!™ travel keyboard, both available from KeyOvation, LLC, Cedar Park, Tex.

However, the use of the locking lever in such adjustable keyboards has been found to add non-intuitive steps to the keyboard adjustment process. For example, a user typically must use two hands to unlock the locking lever (e.g., by grasping the keyboard segment that includes the locking lever with one hand, and then unlocking the locking lever with the other hand), then position their hands to grasp each of the keyboard segments separately so that they may be adjusted relative to each other and into the desired ergonomic orientation, and then hold the segments in the desired position while they manipulate the locking lever to lock the keyboard segments into the desired ergonomic orientation. This keyboard adjustment process may cause initial problems for a user attempting to use the adjustable keyboard until they have mastered it, which may influence some users to not use the adjustable keyboard. Furthermore, some users may forget to unlock the locking lever during the keyboard adjustment process, and instead forcibly adjust the keyboard segments relative to each other and against the resistance of the locking lever, which can degrade the effectiveness of the locking lever.

Accordingly, improved ergonomic keyboard solutions are desired.

SUMMARY

It has been discovered that an ergonomic keyboard that allows keyboard segments to be adjusted, such as in tented and/or splayed configurations to reduce pronation and/or ulnar deviation in a given user's interaction therewith, may be provided with a novel locking mechanism that presents the user with a more intuitive keyboard adjustment process. Specifically, it has been discovered that a locking mechanism may be provided that is actuated and de-actuated through a user force provided on the keyboard segments of the keyboard that is being adjusted, allowing a user to provide an unlocking force on the keyboard segments while also manipulating the keyboard segments into a desired ergonomic orientation, thus eliminating the need for a locking lever.

Using keyboard designs described herein, information technology (IT) departments may provide their mobile workforces with the adjustable ergonomic features favored by corporate health and safety programs as well as by insurers, while recognizing the practical, real-world, form factor constraints that affect "road warriors," sales professionals and other frequent business travelers. Such keyboard designs may, in some embodiments, be folded for travel in compact clamshell configurations in which keyboard segments enclose and protect keys from damage. Upon arrival, the user may simply (i) unfold the clamshell, (ii) stow and thereby immobilize one rotational coupling of the fold-over, dual-joint hinge mechanism, (iii) and unlock, adjust and then lock the other rotational coupling to provide the keyboard segments in a suitable tented and/or splayed position for use.

In some embodiments in accordance with the present disclosure, an input system is provided that includes at least one base portion; a plurality of multi-function keys that are located on the at least one base portion; a function lock key that is located on the at least one base portion; a function activation key that is located on the at least one base portion; and a key function engine that is coupled to the plurality of multi-function keys, the function lock key, and the function activation key, wherein the key function engine is configured to: provide the plurality of multi-function keys in a first function mode; change the function mode of the plurality of multi-function keys from the first function mode to a second function mode in response to receiving a first input through the function activation key that is followed by a second input that is received through the function lock key; and subsequent to receiving the second input through the function lock key, change the function mode of the plurality of multi-function keys between the second function mode and the first function mode in response to each subsequent input that is received through the function activation key.

In some embodiments in accordance with the present disclosure, at least one of the plurality of multi-function keys is configured to provide a letter in the first function mode and a number in the second function mode. In some embodiments in accordance with the present disclosure, the plurality of multi-function keys are configured to provide a portion of a set of character keys in the first function mode, and wherein the plurality of multi-function keys are configured to provide a numeric keypad in the second function mode. In some embodiments in accordance with the present disclosure, the input system includes a function activation key indicator that is coupled to the key function engine, wherein the key function engine is configured to provide a first indication from the function activation key indicator in response to receiving the first input through the function activation key, and wherein the key function engine is configured to provide a second indication from the function activation key indicator in response to receiving the second input through the function lock key subsequent to receiving the first input through the function activation key. In some embodiments in accordance with the present disclosure, the at least one base portion includes a first base portion and a second base portion, and wherein the function activation key is located on the first base portion and the plurality of multi-function keys and the function lock key are located on the second base portion. In some embodiments in accordance with the present disclosure, the at least one base portion includes a front edge and a rear edge that is located opposite the at least one base portion from the front edge, and wherein the function lock key is included in a key row that is located on the at least one base portion between the rear edge and a plurality of key rows that include the plurality of multi-function keys. In some embodiments in accordance with the present disclosure, the key function engine is further configured to: provide the plurality of multi-function keys in the second function mode; and change the function mode of the plurality of multi-function keys from the second function mode to the first function mode in response to receiving a third input through the function lock key.

In some embodiments in accordance with the present disclosure a keyboard is provided that includes a keyboard base including a plurality of physical keys; a key function engine that is included in the keyboard base and that is coupled to the plurality of physical keys, wherein the key function engine is configured to: provide at least one multi-function physical key of the plurality of physical keys in a first function mode; change the function mode of the at least one multi-function physical key from the first function mode to a second function mode in response to receiving a first input through a function activation physical key of the plurality of physical keys that is followed by a second input that is received through a function lock physical key of the plurality of physical keys; and subsequent to receiving the second input through the function lock physical key, change the function mode of the at least one multi-function physical key between the second function mode and the first function mode in response to each subsequent input that is received through the function activation physical key.

In some embodiments in accordance with the present disclosure, the at least one multi-function physical key is configured to provide a letter in the first function mode and a number in the second function mode. In some embodiments in accordance with the present disclosure, the at least one multi-function physical key includes a plurality of multi-function physical keys that are configured to provide a portion of a set of character keys in the first function mode, and a numeric keypad in the second function mode. In some embodiments in accordance with the present disclosure, the key function engine is further configured to: provide a first indication in response to receiving the first input through the function activation physical key, and provide a second indication in response to receiving the second input through the function lock physical key subsequent to receiving the first input through the function activation physical key. In some embodiments in accordance with the present disclosure, the keyboard base includes a first keyboard segment and a second keyboard segment, and wherein the function activation physical key is located on the first keyboard segment and the at least one multi-function physical key and the function lock physical key are located on the second keyboard segment. In some embodiments in accordance with the present disclosure, the keyboard base includes a front edge and a rear edge that is located opposite the keyboard base from the front edge, and wherein the function lock physical key is included in a key row that is located on the keyboard base between the rear edge and a plurality of key rows that include the at least one multi-function physical key. In some embodiments in accordance with the present disclosure, the key function engine is further configured to: provide the at least one multi-function physical key in the second function mode; and change the function mode of the at least one multi-function physical key from the second function mode to the first function mode in response to receiving a third input through the function lock physical key.

In some embodiments in accordance with the present disclosure, a method for providing multiple functions on an input system includes providing, on a keyboard, a plurality of multi-function keys in a first function mode; changing a function mode of the plurality of multi-function keys from the first function mode to a second function mode in response to receiving a first input through a function activation key on the keyboard that is followed by a second input that is received through a function lock key on the keyboard; and subsequent to receiving the second input through the function lock key, changing the function mode of the plurality of multi-function keys between the second function mode and the first function mode in response to each subsequent input that is received through the function activation key In some embodiments in accordance with the present disclosure, at least one of the plurality of multi-function keys is configured to provide a letter in the first function mode and a number in the second function mode. In some embodiments in accordance with the present disclosure, the plurality of multi-function keys are configured to provide a portion of a set of character keys in the first function mode, and wherein the plurality of multi-function keys are configured to provide a numeric keypad in the second function mode. In some embodiments in accordance with the present disclosure, the method further includes providing a first indication in response to receiving the first input through the function activation key; and providing a second indication in response to receiving the second input through the function lock key subsequent to receiving the first input through the function activation key. In some embodiments in accordance with the present disclosure, the keyboard includes a front edge and a rear edge that is located opposite the keyboard from the front edge, and wherein the function lock key is included in a key row that is located on the keyboard between the rear edge and a plurality of key rows that include the plurality of multi-function keys. In some embodiments in accordance with the present disclosure, the method further includes providing the plurality of multi-function keys in the second function mode; and changing the function mode of the plurality of multi-function keys from the second function mode to the first function mode in response to receiving a third input through the function lock key.

BRIEF DESCRIPTION OF THE DRAWINGS

FIG. 1b is a bottom view illustrating an embodiment of the keyboard input system of FIG. 1a.

FIG. 2c is a front view illustrating an embodiment of the portion of the manipulation mechanism of FIG. 2b.

FIG. 2f is a partial cross-sectional view illustrating an embodiment of the manipulation mechanism of FIG. 2a.

FIG. 3b is a side view illustrating an embodiment of a portion of the manipulation mechanism of FIG. 3a.

FIG. 3c is a front view illustrating an embodiment of the portion of the manipulation mechanism of FIG. 3a.

FIG. 4 is a flow chart illustrating an embodiment of a method for adjusting a keyboard.

FIG. 12b is a top view illustrating an embodiment of the keyboard input system of FIG. 12a.

DETAILED DESCRIPTION

The present disclosure describes a keyboard having keying surfaces including a plurality of keys, the keyboard having at least two segments that are movable relative to one another, with each segment of the keyboard presenting a user with keys on its respective keying surface. Typically, the keyboard has at least two pivotable segments which are attached to one another at a top end of the keyboard segments by a manipulation mechanism such that a front edge of the keyboard may spread apart or "splay" in at least a substantially horizontal plane, to thereby reduce ulnar deviation in the keyboard user. The manipulation mechanism may also be adapted to allow pivoting in both horizontal and vertical planes such that the two segments of the keyboard may reside in different planes to provide the center of the keyboard raised to reduce pronation and therefore decrease tension in the wrists and forearms of the user.

The manipulation mechanism includes a locking mechanism that allows the user to unlock the keyboard segments and adjust their relative positions intuitively. For example, the user may provide opposing forces on each of the keyboard segments that overcomes a biasing force provided in the locking mechanism and unlocks the locking mechanism, which allows the user to then adjust those keyboard segments to a desired ergonomic orientation, and then release the opposing forces to allow the locking mechanism to be biased back such that the keyboard segments are locked into position that their relative movement is resisted by the locking mechanism.

In addition to the foregoing ergonomic features, in some embodiments the keyboard may further provide a fold-over manipulation mechanism for providing the keyboard in a folded or stacked orientation via the operations detailed below. In general, embodiments of the present invention(s) may be better understood, and its numerous objects, features, and advantages made apparent to those skilled in the art by referencing the accompanying drawings. The use of the same reference symbols in different drawings indicates similar or identical items.

Figure 1A:
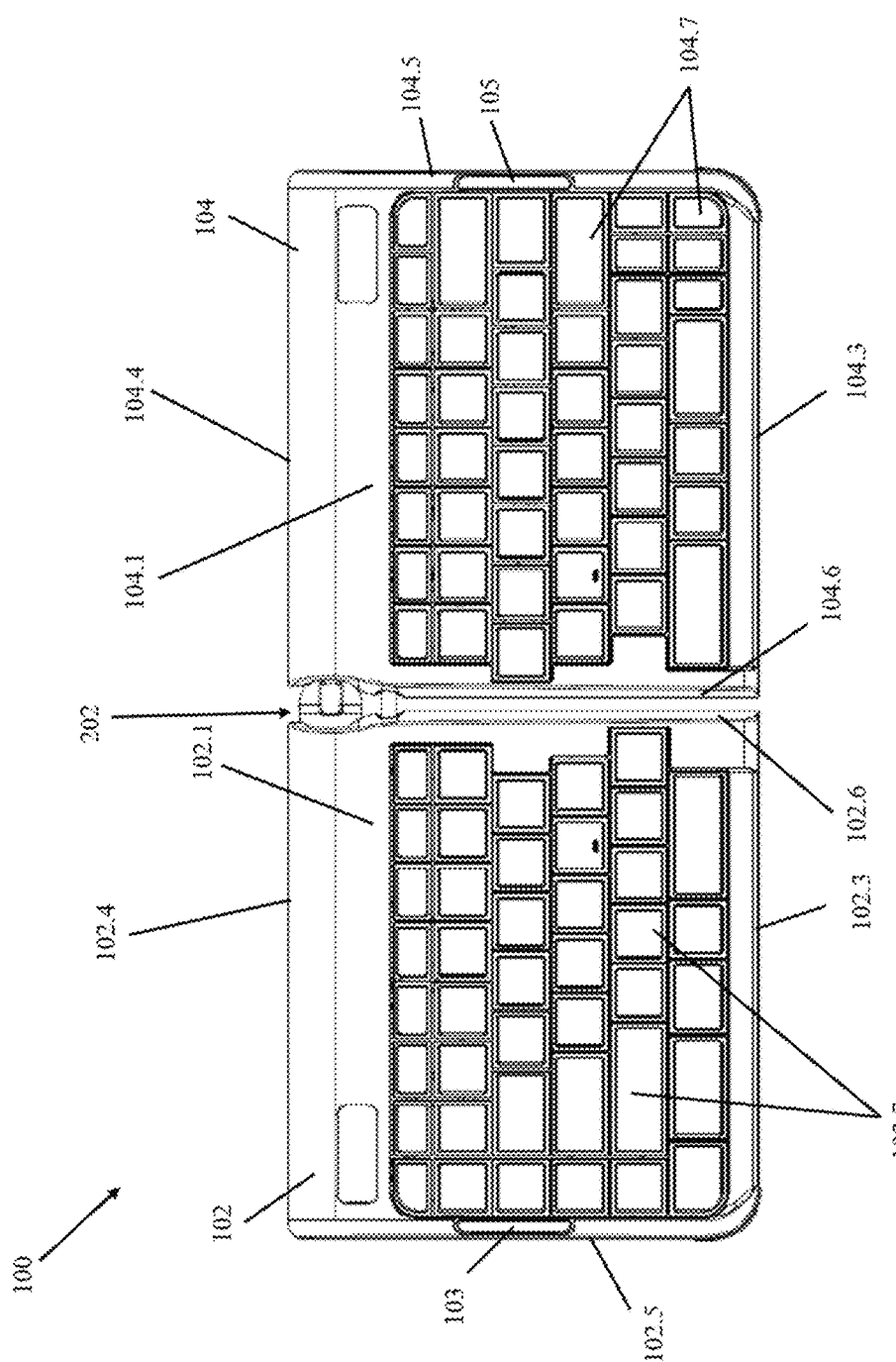
FIG. 1a is a top view illustrating an embodiment of a keyboard input system including a first portion coupled to a second portion by a manipulation mechanism.
Figure 1B:
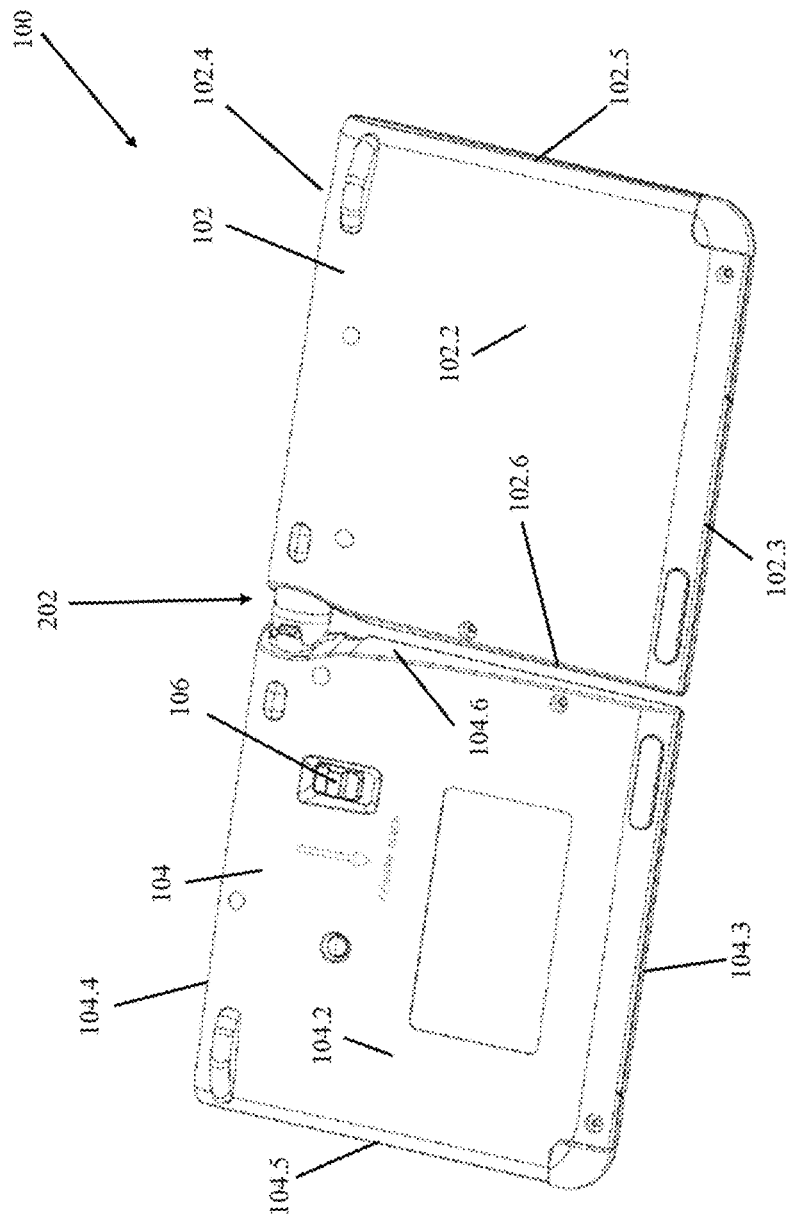

Referring now to FIGS. 1a and 1b, an embodiment of an adjustable ergonomic input system 100 is illustrated. The input system 100 includes a first base portion 102 and a second base portion 104. The first base portion 102 includes a top surface 102.1, a bottom surface 102.2 that is located opposite the first base portion 102 from the top surface 102.1, a front edge 102.3 extending between the top surface 102a and the bottom surface 102.2, a rear edge 102.4 located opposite the first base portion 102 from the front edge 102.3 and extending between the top surface 102.1 and the bottom surface 102.2, an outer side edge 102.5 extending between the top surface 102a, the bottom surface 102.2, the front edge 102.3, and the rear edge 102.4, and an inner side edge 102.6 located opposite the first base portion 102 from the outer side edge 102.5 and extending between the top surface 102a, the bottom surface 102.2, the front edge 102.3, and the rear edge 102.4.

The first base portion 102 includes one or more mating surfaces such as, for example, a mating surface 103 that is located on the top surface 102.1, immediately adjacent the outer side edge 102.5 and approximately midway between the front edge 102.3 and the rear edge 102.4. The feature on the first base portion 102 that provides the mating surface 103 may be dimensioned such that, in some of the embodiments discussed below, none of the keying surfaces on the first base portion 102 extend past the mating surface 103 to ensure that input device events are not generated (e.g., keys are not depressed) when the first base portion 102 and the second base portion 104 are in a folded or stacked orientation, discussed in further detail below. In an embodiment, the mating surface 103 may be part of a folded/stacked orientation securing system used to secure the first base portion 102 to the second base portion 104 when in a folded or stacked orientation, discussed in further detail below. When used as part of a folded/stacked orientation securing system, the mating surface 103 may be part of a latch that includes latching features, a magnet, and/or a variety of other catch system elements known in the art.

The second base portion 104 includes a top surface 104.1, a bottom surface 104.2 that is located opposite the second base portion 104 from the top surface 104.1, a front edge 104.3 extending between the top surface 104.1 and the bottom surface 104.2, a rear edge 104.4 located opposite the second base portion 104 from the front edge 104.3 and extending between the top surface 104.1 and the bottom surface 104.2, an outer side edge 104.5 extending between the top surface 104.1, the bottom surface 104.2, the front edge 104.3, and the rear edge 104.4, and an inner side edge 104.6 located opposite the second base portion 104 from the outer side edge 104.5 and extending between the top surface 104.1, the bottom surface 104.2, the front edge 104.3, and the rear edge 104.4. In some embodiments, the second base portion 104 includes a second moveable coupling lock release member 106 on the bottom surface 104.2, discussed in further detail below.

The second base portion 104 includes one or more mating surfaces such as, for example, a mating surface 105 that is located on the top surface 104.1, immediately adjacent the outer side edge 104.5 and approximately midway between the front edge 104.3 and the rear edge 104.4. The feature on the second base portion 104 that provides the mating surface 105 may be dimensioned such that, in some of the embodiments discussed below, none of the keying surfaces on the second base portion 104 extend past the mating surface 105 to ensure that input events are not generated (e.g., keys are not depressed) when the first base portion 102 and the second base portion 104 are in a folded or stacked orientation, discussed in further detail below. In an embodiment, the mating surface 105 may be part of a folded/stacked orientation securing system used to secure the first base portion 102 to the second base portion 104 when in the folded or stacked orientation, discussed in further detail below. When used as part of a folded/stacked orientation securing system, the mating surface 105 may be part of a latch that includes latching features, a magnet, and/or a variety of other catch system elements known in the art.

Each of the first base portion 102 and the second base portion 104 include at least one input device 102.7 and 104.7, respectively, that provides a keying surface. In the illustrated embodiment, the input system 100 is a keyboard input system including a left-side keyboard segment as the first base portion 102 and a right-side keyboard segment as the second base portion 104, with each keyboard segment including a plurality of physical keys as the input devices 102.7 and 104.7, respectively, provided on their top surfaces 102.1 and 104.1, respectively. However, the base portions 102 and 104 on the input system 100 may include a variety of other keying surface input devices in addition to, or in place of, the physical keys, and at additional or different locations other than the top surfaces 102.1 and 104.1. For example, either or both of the first base portion 110 and second base portion 120 may include a touch sensitive device or display that allows a user to provide keying inputs by touch (e.g., gestures, "taps", and/or other touch inputs known in the art), that displays a virtual keyboard or keying surface including one or more virtual keys selectable by the user, and/or that provides any other touch input functionality known in the art. Furthermore, the location of input device(s) on the base portions 102 and 104 may include any or all of their top surface, bottom surface, front edge, rear edge, or side edges. As such, while the illustrated embodiments discussed below are directed to physical key input devices located on a top surface of each of the base portions 102 and 104, other embodiments of the present disclosure should not be limited by the types or locations of input devices provided on the base portions 102 and 104 of the input system 100.

Figure 2A:
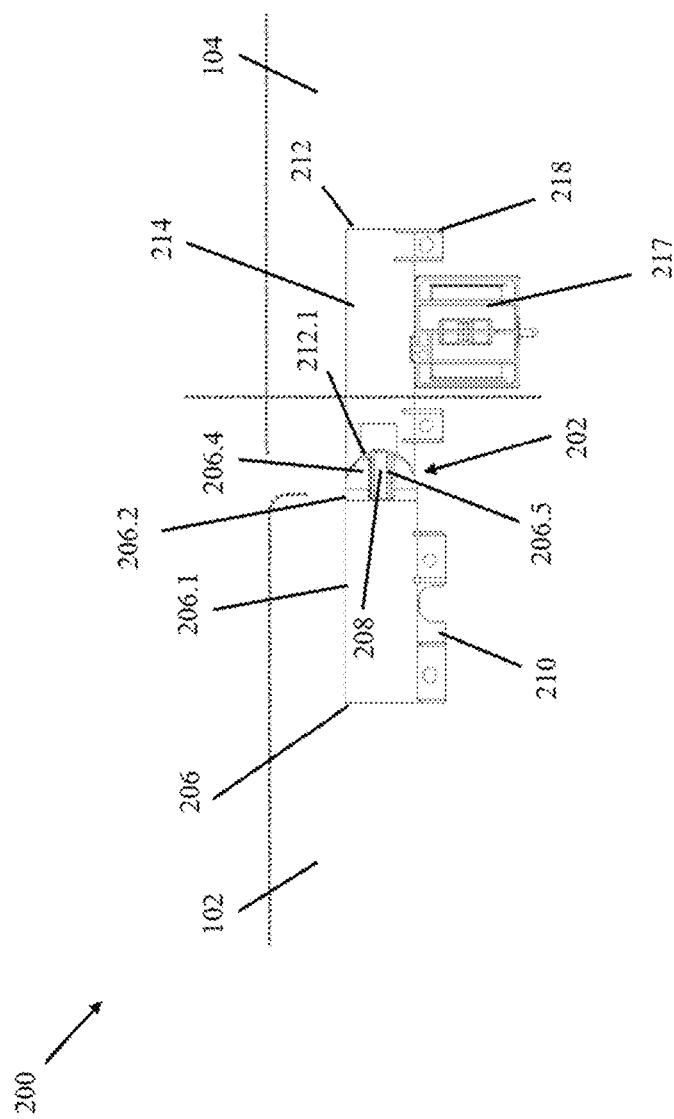
FIG. 2a is a side view illustrating an embodiment of the manipulation mechanism used with the keyboard input system of FIGS. 1a and 1b.
Figure 2B:
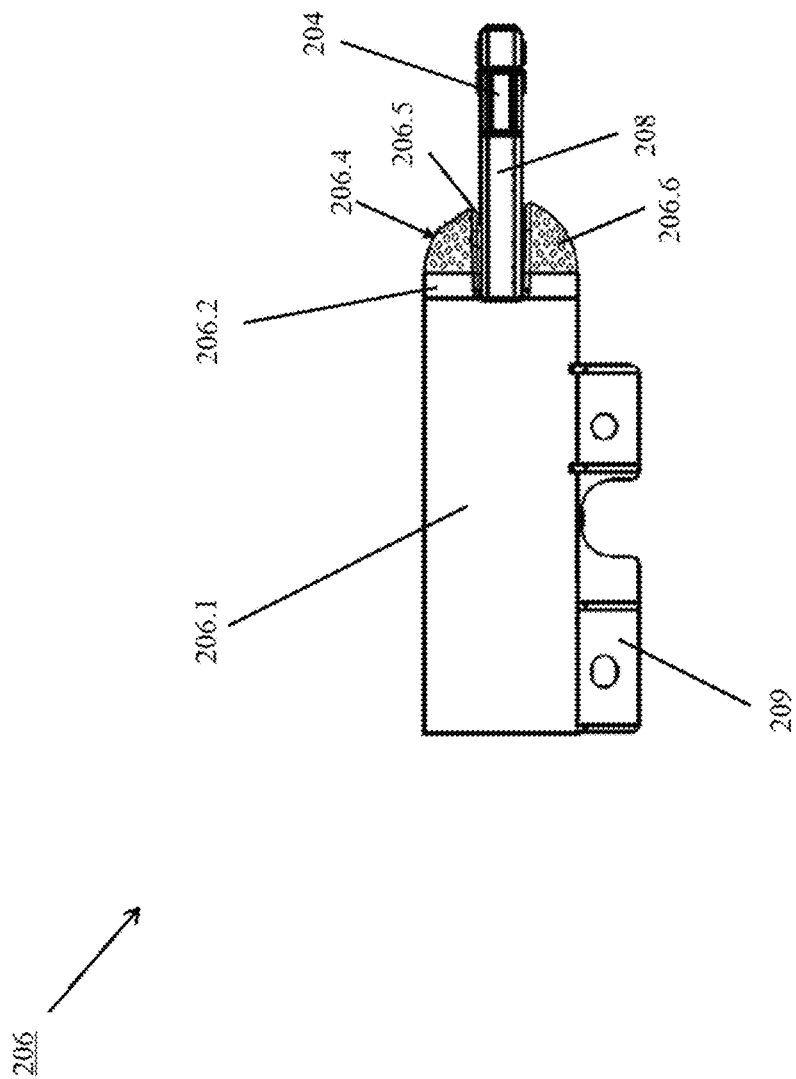
FIG. 2b is a side view illustrating an embodiment of a portion of the manipulation mechanism used with the keyboard input system of FIGS. 1a and 1b.
Figure 2D:
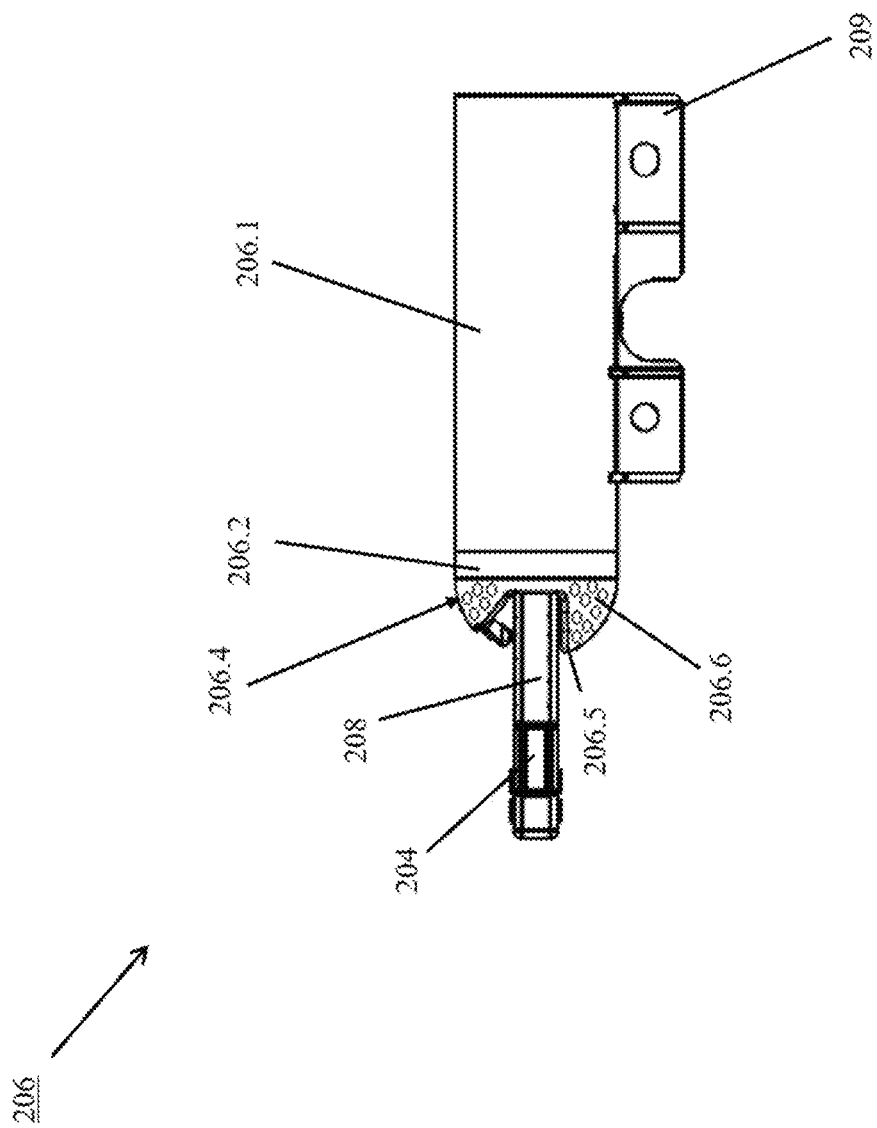
FIG. 2d is a side view illustrating an embodiment of the manipulation mechanism of FIGS. 2b and 2c.
Figure 2E:
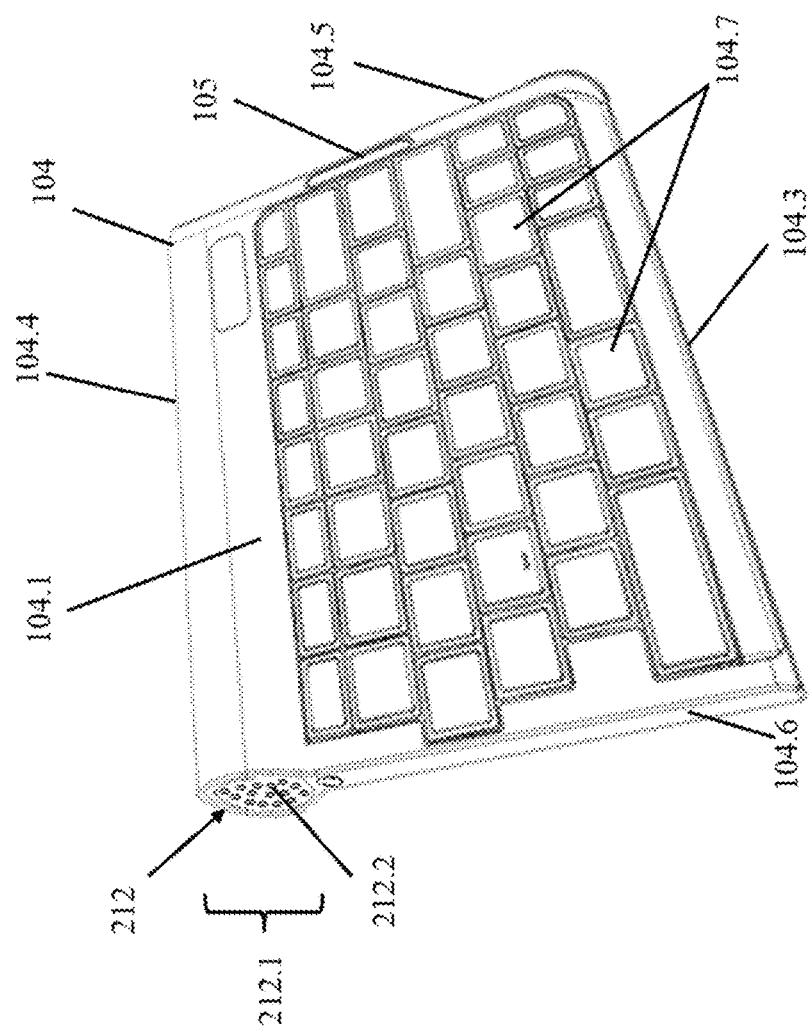
FIG. 2e is a perspective view illustrating an embodiment of a portion of the manipulation mechanism used with the portion of FIGS. 2b-2d.
Figure 2F:
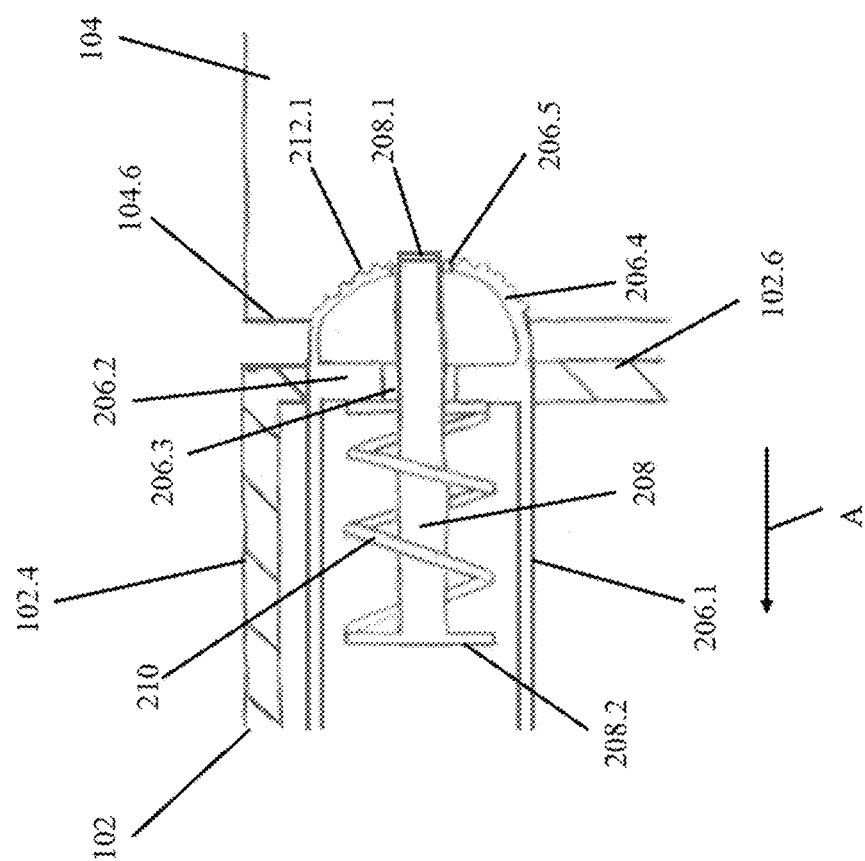

Referring to FIGS. 1a, 1b, 2a, 2b, 2c, 2d, 2e, and 2f, an embodiment of a base portion manipulation mechanism 200 is illustrated that couples the first base portion 102 to the second base portion 104. In the embodiment illustrated in FIGS. 2a-f, the base portion manipulation mechanism 200 provides a first moveable coupling 202 that is configured to provide the first base portion 102 and the second base portion 104 in a tented orientation, a splayed orientation, or a tented and splayed orientation, discussed in further detail below with regard to the method of FIG. 4, and a second moveable coupling 204 that is configured to provide the first base portion 102 and the second base portion 104 in a folded or stacked orientation, discussed in further detail below with regard to the method of FIG. 8. As discussed below, the base portion manipulation mechanism 200 includes a first manipulation mechanism section 206 and a second manipulation mechanism section 212, with FIG. 2a illustrating the first and second manipulation mechanism sections 206 and 212 coupled together without the first and second base portions 102 and 104 of the input system 100 illustrated, FIG. 2f illustrating the first and second manipulation mechanism sections 206 and 210 coupled together while also being coupled to the first and second base portions 102 and 104 of the input system 100, FIGS. 2b-d illustrating the first manipulation mechanism by itself, and FIG. 2e illustrating the second manipulation mechanism section 212 coupled to the second base portion 104. In the illustrated embodiment, the first moveable coupling 202 and the second moveable coupling 204 are provided on the base portion manipulation mechanism 200 in a spaced-apart orientation from each other with the second moveable coupling 204 on the first manipulation mechanism section 206 coupled to the second manipulation mechanism section 210 (when the second manipulation mechanism section 210 is housed in the second base portion 104), as illustrated and described below with reference to the method of FIG. 8. While the illustrated embodiment includes both the first moveable coupling 202 and the second moveable coupling 204, in some embodiments the input system 100 may be provided without the second moveable coupling 204 (i.e., in some embodiments, the input system 100 may be ergonomically adjustable but may not have fold-over functionality for compact storage.)

Referring to FIGS. 2a, 2b, 2c, 2d, and 2f, an embodiment of the first manipulation mechanism section 206 of the base portion manipulation mechanism 200 is illustrated. The first manipulation mechanism section 206 includes a cylindrical housing 206.1 having a front wall 206.2 that is located adjacent the inner side edge 102.6 of the first base portion 102 when the first manipulation mechanism section 206 is coupled to the first base portion 206, as illustrated in FIG. 2f. The front wall 206.2 defines a first pivotable arm passageway 206.3 that extends through the entirety of the front wall 206.2. A hollow, hemispherical projection 206.4 extends from the front wall 206.2 and opposite the front wall 206.2 from the cylindrical housing 206.1. The hemispherical projection 206.4 defines a second pivotable arm passageway 206.5, discussed in further detail below, that extends through the entirety of the hemispherical projection 206.4. The hemispherical projection 206.4 also includes a locking engagement surface 206.6 that is discussed in further detail below.

A pivotable arm 208 is partially housed in the cylindrical housing 206.1, extends through the first pivotable arm passageway 206.3 and the second pivotable arm passageway 206.5, and is coupled to the second manipulation mechanism section 212 through a coupling 208.1 (e.g., a welded coupling, an adhesive coupling, a threaded coupling, and/or a variety of other couplings known in the art). As illustrated in FIGS. 2b and 2d, in embodiments that include the second moveable coupling 204, the pivotable arm 208 may include the second moveable coupling 204 adjacent an end of the pivotable arm 208 that extends through the second pivotable arm passageway 206.5. The pivotable arm 208 includes a flange 208.2 on an end of the pivotable arm 208 that is located in the cylindrical housing 206.1. A biasing member 210 (e.g., a spring in the illustrated embodiment) is positioned in the cylindrical housing 206.1 and engages each of the front wall 206.2 and the flange 208.2 to provide a biasing force in a direction A that biases the pivotable arm 208 into the cylindrical housing 206.1. In an embodiment, the first pivotable arm passageway 206.3 includes a pivotable coupling that allows the pivotable arm 208 to perform the pivoting motions described below with reference to the method of FIG. 4.

Referring to FIGS. 2a, 2e, and 2f, an embodiment of the second manipulation mechanism section 212 of the base portion manipulation mechanism 200 is illustrated. The second manipulation mechanism section 212 includes a socket 212.1 that is defined adjacent the inner side edge 104.6 of the second base portion 104 when the second manipulation mechanism section 212 is coupled to the second base portion 104, as illustrated in FIG. 2e. A locking engagement surface 212.2 is provided in the socket 212.1 and is discussed in further detail below. The coupling 208.1 discussed above is located in the socket 212.1 and allows the pivotable arm 208 to couple to the second manipulation mechanism section 212. As can be seen from FIGS. 1a, 1b, and 2a-2f, the first manipulation mechanism section 206 may be coupled to the first base portion 102 (e.g., using mounting bracket 209), the second manipulation mechanism section 212 may be coupled to the second base portion 104 (e.g., using mounting bracket 218), and then the pivotable arm 208 of the first manipulation mechanism section 206 may be connected to the coupling 208.1 on the second manipulation mechanism section 212 to provide the first base portion 102 and the second base portion 104 coupled together as illustrated in FIGS. 1a and 1b.

Furthermore, in embodiments that include the second moveable coupling 204, when the first manipulation mechanism section 206 and the second manipulation mechanism section 212 are coupled together, the second moveable coupling 204 may provide a pivotal connection that provides a hinge coupling between the first base portion 102 and the second base portion 104 that is discussed below with reference to the method of FIG. 8. However, while a specific example of a base portion manipulation mechanism including spaced-apart rotational couplings (e.g., the pivotable arm 208 and the hinge provided by the second moveable coupling 204) is illustrated and described below, one of skill in the art in possession of the present disclosure would recognize that the base portion manipulation mechanism may include a moveable coupling or moveable couplings that are not illustrated but that could be used to provide the tented orientation, splayed orientation, and/or folded/stacked orientation discussed below without departing from the scope of the present disclosure.

The base portion manipulation mechanism 200 also includes a first moveable coupling locking system that is provided by the locking engagement surface 206.6 on the hemispherical projection 206.4 and the locking engagement surface 212.2 in the socket 212.1. In the illustrated embodiment, the locking engagement surface 212.2 includes a plurality of projections while the locking engagement surface 206.6 includes a plurality of dimples, and those projections and dimples are dimensioned to engage each other and increase the static friction between the hemispherical projection 206.4 and the socket 212.1 when the hemispherical projection 206.4 is located in the socket 212.1. Furthermore, one of skill in the art in possession of the present disclosure will recognize that the biasing member 210 that provides the biasing force in the direction A causes the hemispherical projection 206.4 to be urged toward the socket 212.1 absent an opposing force, thus engaging the projections in the socket 212.1 with the dimples in the hemispherical projection 206.4 to prevent relative movement between the two (and in turn the first base portion 102 and the second base portion 104, respectively, that are coupled to them.) As such, the force provided by the biasing member 210 (e.g., a spring force provided by a chosen spring) may be selected such that the hemispherical projection 206.4 and the socket 212.2 remain engaged absent a predetermined force (e.g., a force that would prevent relative movement of the first base portion 102 and the second base portion 104 during keyboard operations, but that would not be so great as to prevent users from adjusting the first base portion 102 relative to the second base portion 104, discussed below.)

While projections and dimples have been illustrated and described above as being provided as the locking engagement surfaces 206.6 and 212.2 on the hemispherical projection 206.4 and the socket 212.1, one of skill in the art in possession of the present disclosure will recognize that a variety of surfaces on the hemispherical projection 206.4 and the socket 212.1 will, along with the biasing force provided by the biasing member 210, provide a static force that prevents relative movement of the first base portion 102 and the second base portion 104 during keyboarding operations. For example, rubberized surfaces, rough surfaces, and/or a variety of other surfaces known in the art may be substituted for the projections and dimples while falling within the scope of the present disclosure. Furthermore, any complementary and/or interlocking surfaces that, in combination with the biasing force provided by the biasing member, operate to restrict relative movement of the first base portion 102 and the second base portion 104 are envisioned as falling within the scope of the present disclosure Referring now to FIGS. 2g and 2h, in embodiments that include the second moveable coupling 204, the second manipulation mechanism section 212 may also include a second moveable coupling stowing system that, in the illustrated embodiment, includes a stowing housing 214 that defines a channel 214.1. When coupled to the coupling 208.1 of the second manipulation mechanism section 212, the second moveable coupling 204 is connected to a base 216 that is moveably coupled to the stowing housing 214 such that second moveable coupling 204 is configured to move in and out of the channel 214a. The base 216 includes a pair of spaced-apart locking aperture 216.1 and 216.2. A locking system 217 for the second moveable coupling stowing system includes a locking member 217.1 that is biased (e.g., using a spring or other biasing member) into a position in one of the locking apertures 216.1 and 216.2 depending on the position of the base 216 in the stowing housing 214/channel 214a. As can be seen in FIGS. 1a and 1b, along with the phantom lines in FIGS. 2g and 2h, the section of the base portion manipulation mechanism 200 that includes the second moveable coupling stowing system is located in the second base portion 104 and includes features such as the mounting bracket 218 to secure that section to the second base portion 104. With the second moveable coupling stowing system located in the second base portion 104, the locking system 217 is coupled to the second moveable coupling lock release member 106 on the second base portion 106 to allow actuation of the locking member 217.1, discussed in further detail below. While a specific example of a second moveable coupling stowing system has been provided, one of skill in the art will recognize that a variety of different stowing mechanisms for stowing the second moveable coupling, discussed below, will fall within the scope of the present disclosure. Furthermore, in some embodiments, the second moveable coupling 204 may not be included in the base portion manipulation mechanism 200, and thus the second moveable coupling stowing system may be omitted.

In an embodiment, the first moveable coupling locking system on the first manipulation mechanism section 206 of the base portion manipulation mechanism 200 provides a lockable joint mechanism with multiple rotational degrees of freedom when unlocked/released (e.g., by engaging/disengaging the hemispherical projection 206.4 and the socket 212.1) and, when frictionally engaged, substantially immobilizes rotation about the lockable joint to fix the left- and right-side keyboard segments in any of a variety of tented, splayed or tented and splayed relative positions or orientations.

Figure 3A:
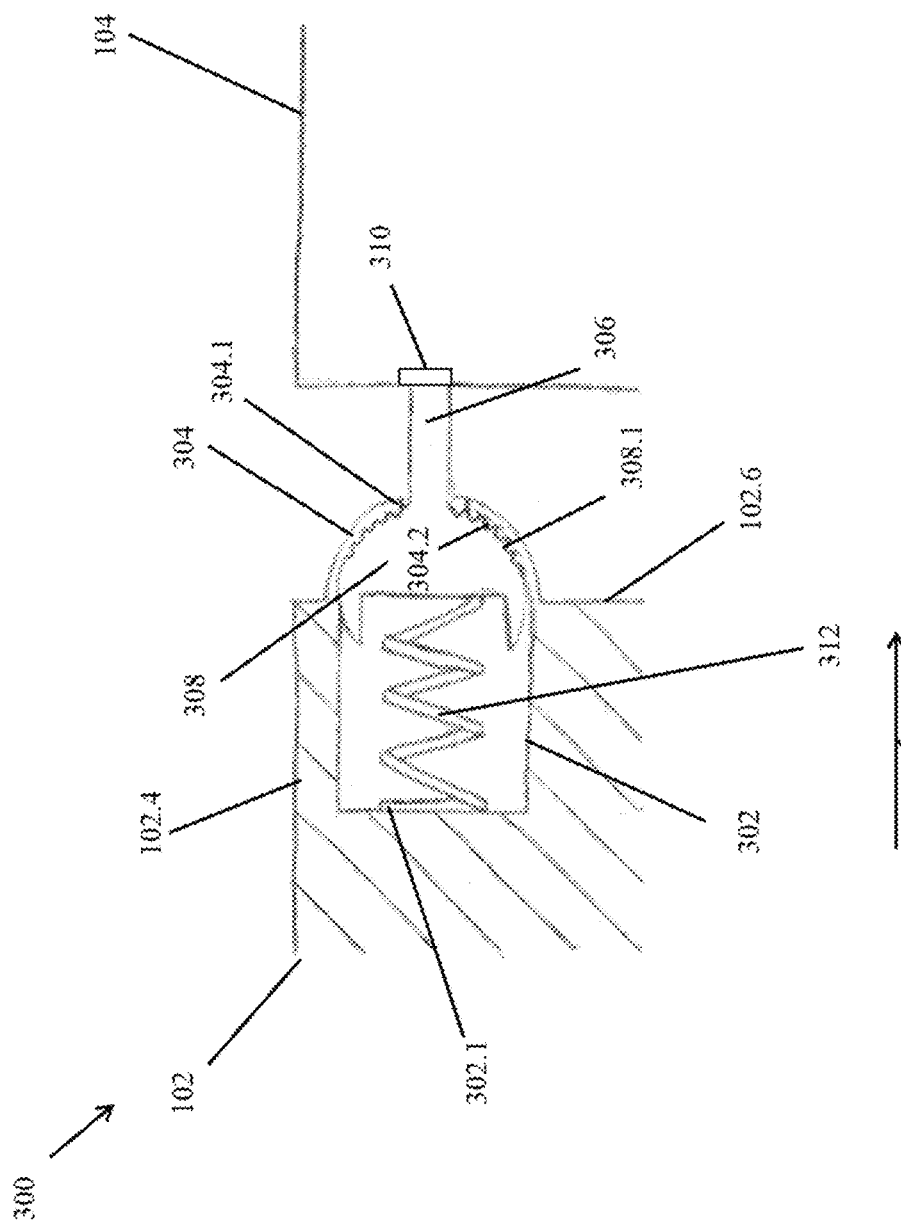
FIG. 3a is a partial cross-sectional view illustrating an embodiment of a manipulation mechanism used with the keyboard input system of FIGS. 1a and 1b.

Referring now to FIGS. 3a, 3b, 3c, and 3d, an alternative embodiment of a first manipulation mechanism section 300 is illustrated that may replace the first manipulation mechanism section 206 discussed above with reference to FIGS. 2a-f. The first manipulation mechanism section 300 includes a cylindrical housing 302 having a rear wall 302.1 that that is housed in the first base portion 102 when the first manipulation mechanism section 302 is coupled to the first base portion 102, as illustrated in FIG. 3a. A hollow, hemispherical projection 304 extends from the cylindrical housing 302 and the first base portion 102 when the first manipulation mechanism section 302 is coupled to the first base portion 102. The hemispherical projection 304 defines an arm passageway 304.1, discussed in further detail below, that extends through the entirety of the hemispherical projection 304. The hemispherical projection 304 also includes a locking engagement surface 304.2 that is discussed in further detail below.

Figure 3B:
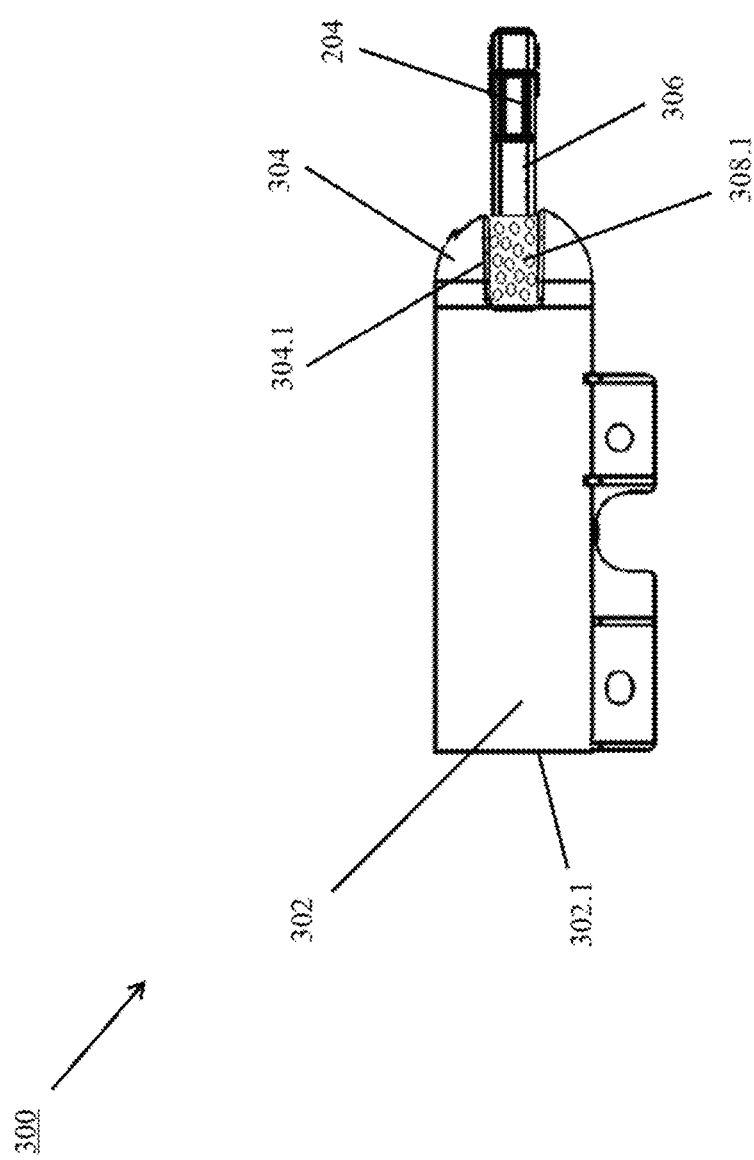
Figure 3C:
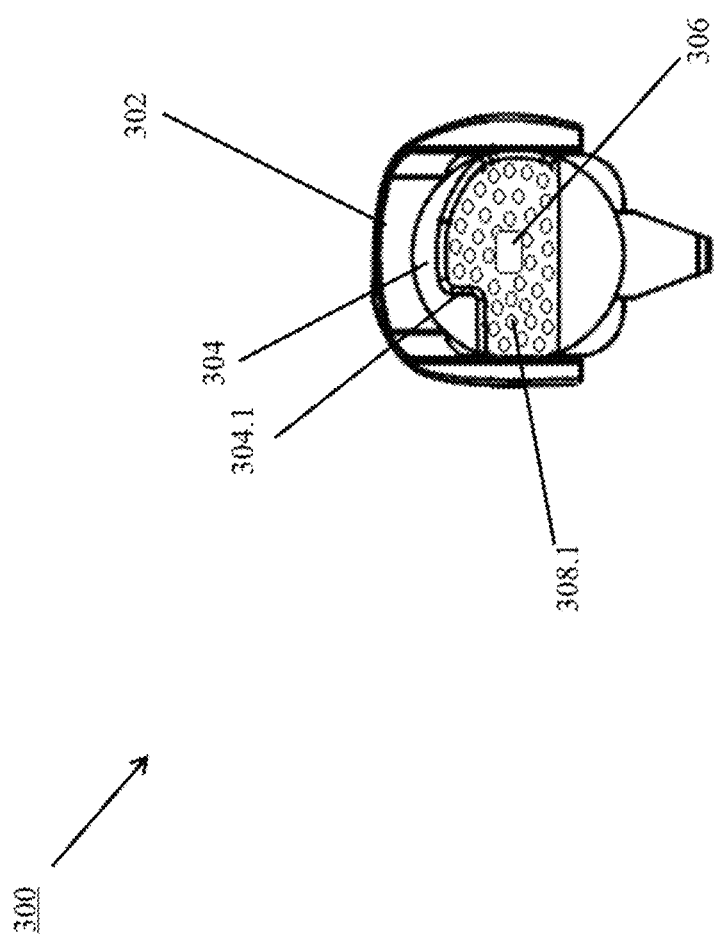
Figure 3D:
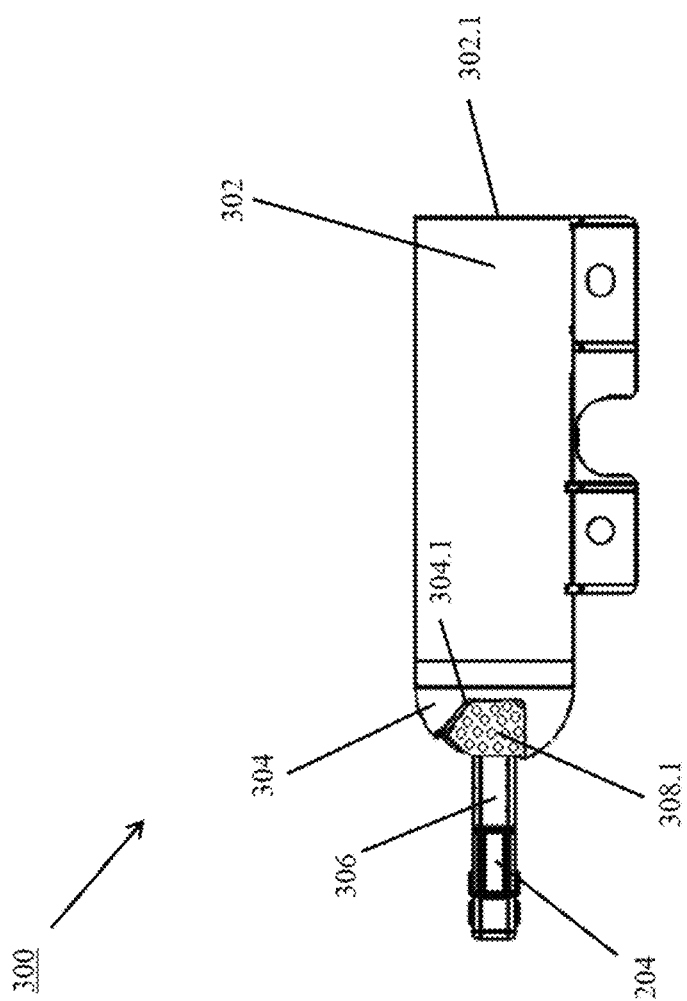
FIG. 3d is a side view illustrating an embodiment of the manipulation mechanism of FIGS. 3a-3c.

An arm 306 is extends from a ball joint 308, through the arm passageway 304.1, and is coupled to the second base portion 104 through a coupling 310 (e.g., welded coupling, an adhesive coupling, a threaded coupling, and/or a variety of other couplings known in the art). As illustrated in FIGS. 3b and 3d, in embodiments that include the second moveable coupling 204, the arm 306 may include the second moveable coupling 204 adjacent an end of the arm 306 that extends through the arm passageway 304.1. The ball joint 308 is housed in the cylindrical housing 302 and the hollow, hemispherical projection 304, and includes a locking engagement surface 308.1 that is discussed in further detail below. A biasing member 312 (e.g., a spring in the illustrated embodiment) is positioned in the cylindrical housing 302 and engages each of the rear wall 302.1 and the ball joint 308 to provide a biasing force in a direction B that biases the ball joint 308 into engagement with the hemispherical projection 204.

The base portion manipulation mechanism 300 also includes a first moveable coupling locking system that is provided by the locking engagement surface 304.2 on the hemispherical projection 304 and the locking engagement surface 308.1 on the ball joint 208. In the illustrated embodiment, the locking engagement surface 304.2 includes a plurality of projections while the locking engagement surface 308.1 includes a plurality of dimples, and those projections and dimples are dimensioned to engage each other to increase the static friction between the hemispherical projection 304 and the ball joint 308 when the ball joint 308 is located in the hemispherical projection 304. Furthermore, one of skill in the art in possession of the present disclosure will recognize that the biasing member 312 that provides the biasing force in the direction B causes the ball joint 304 to be urged toward the hemispherical projection 304 absent an opposing force, thus engaging the projections in the hemispherical projection 304 with the dimples on the ball joint 308 to prevent relative movement between the two (as well as prevent relative movement between the first base portion 102 and the second base portion 104, respectively, that are coupled to them.) As such, the force provided by the biasing member 312 (e.g., a spring force provided by a chosen spring) may be selected such that the ball joint 304 and the hemispherical projection 304 remain engaged absent a predetermined force (e.g., a force that would prevent relative movement of the first base portion 102 and the second base portion 104 during keyboard operations, but that would not be so great as to prevent users from adjusting the first base portion 102 relative to the second base portion 104.)

While projections and dimples have been illustrated and described above as being provided on the hemispherical projection 304 and the ball joint 308, one of skill in the art in possession of the present disclosure will recognize that a variety of surfaces on the hemispherical projection 304 and the ball joint 308 will, along with the biasing force provided by the biasing member 312, provide a static force that prevents relative movement of the first base portion 102 and the second base portion 104. For example, rubberized surfaces, rough surfaces, and/or a variety of other surfaces known in the art may be substituted for the projections and dimples while falling within the scope of the present disclosure. Furthermore, any complementary and/or interlocking surfaces that, in combination with the biasing force provided by the biasing member, operate to restrict relative movement of the first base portion 102 and the second base portion 104 are envisioned as falling within the scope of the present disclosure Referring now to FIGS. 4, 5a, 5b, 6, 7a, 7b, and 7c, embodiments of systems and a method 400 for adjusting a keyboard to provide a variety of tented, splayed, and tented and splayed orientations for the input system 100 are illustrated. Referring first to FIGS. 1a and 4, the method 400 begins at block 402 where the input system 100 is provided with the first based portion 102 and the second base portion 104 in a side-by-side orientation. The first base portion 102 and the second base portion 104 may be provided in a variety of different side-by-side orientations in which the input device(s) on the first base portion 102 and the second base portion 104 are presented to a user for keyboarding. For example, an untented and unsplayed side-by-side orientation is illustrated in FIGS. 1a and 1a in which the first base portion 102 and the second base portion 104 are positioned side-by-side with the inner side edges 102.6 and 104.6 adjacent and substantially parallel, and with the top surfaces 102.1 and 104.1 substantially coplanar.

Figure 7A:
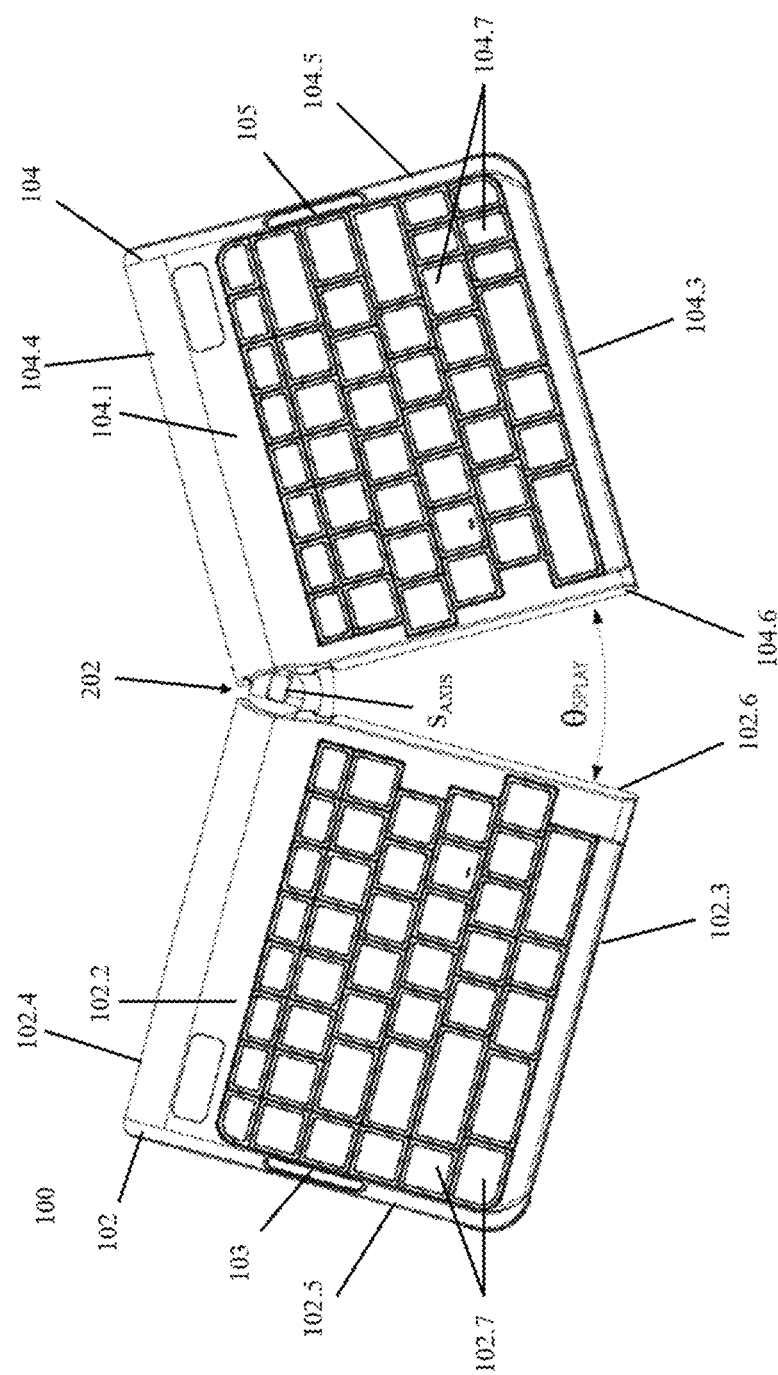
FIG. 7a is a top view illustrating an embodiment of the keyboard input system FIGS. 1a and 1b with the first and second portions in a splayed orientation.
Figure 7B:
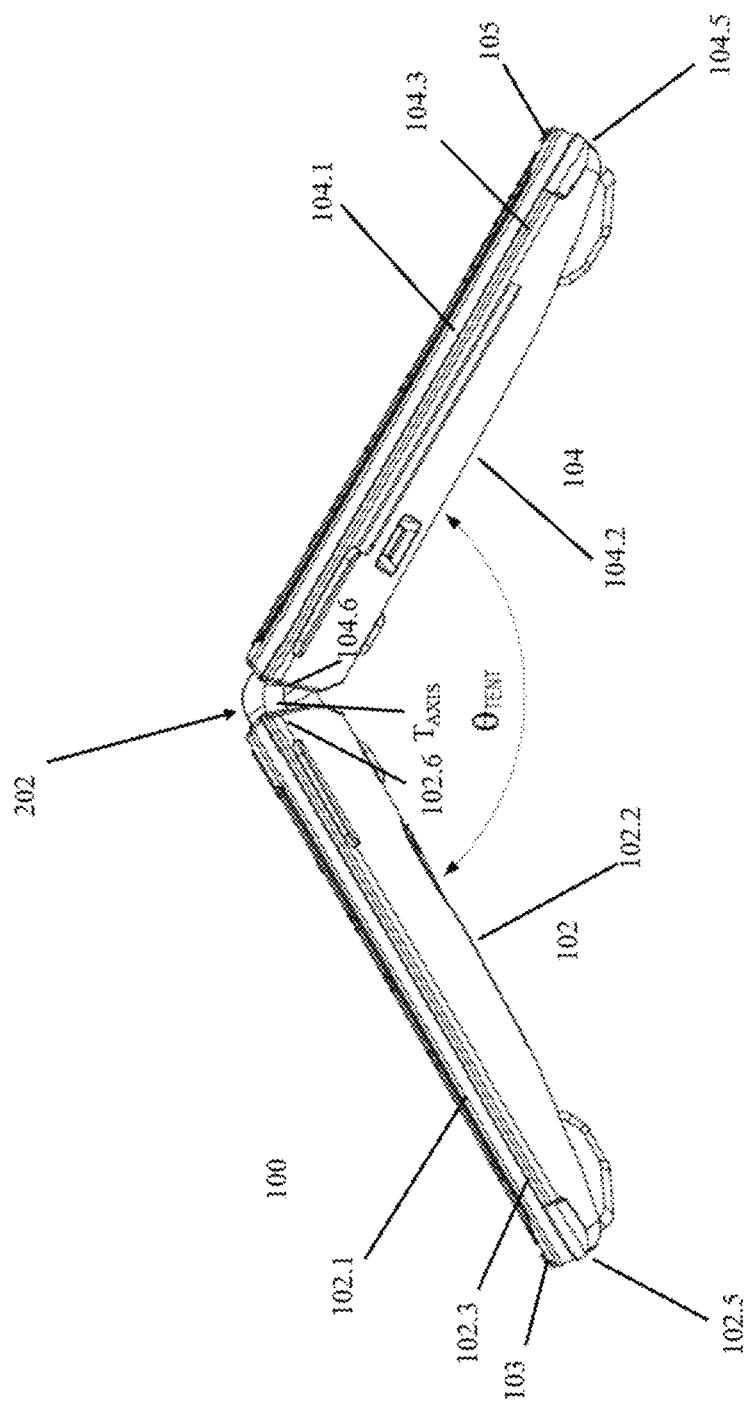
FIG. 7b is a front view illustrating an embodiment of the keyboard input system of FIGS. 1a and 1b with the first and second portions in a tented orientation.

In another example, a splayed side-by-side orientation is illustrated in FIG. 7a in which the first base portion 102 and the second base portion 104 are positioned side-by-side with the inner side edges 102.6 and 104.6 non-parallel and at an angle ($\ominus_{SPLAY}$) to each other, and with the top surfaces 102.1 and 104.1 substantially coplanar. In another example, a tented side-by-side orientation is illustrated in FIG. 7b in which the first base portion 102 and the second base portion 104 are positioned side-by-side with the inner side edges 102.6 and 104.6 substantially parallel, and with the top surfaces 102.1 and 104.1 at an angle ($\ominus_{TENT}$) to each other.

Figure 7C:
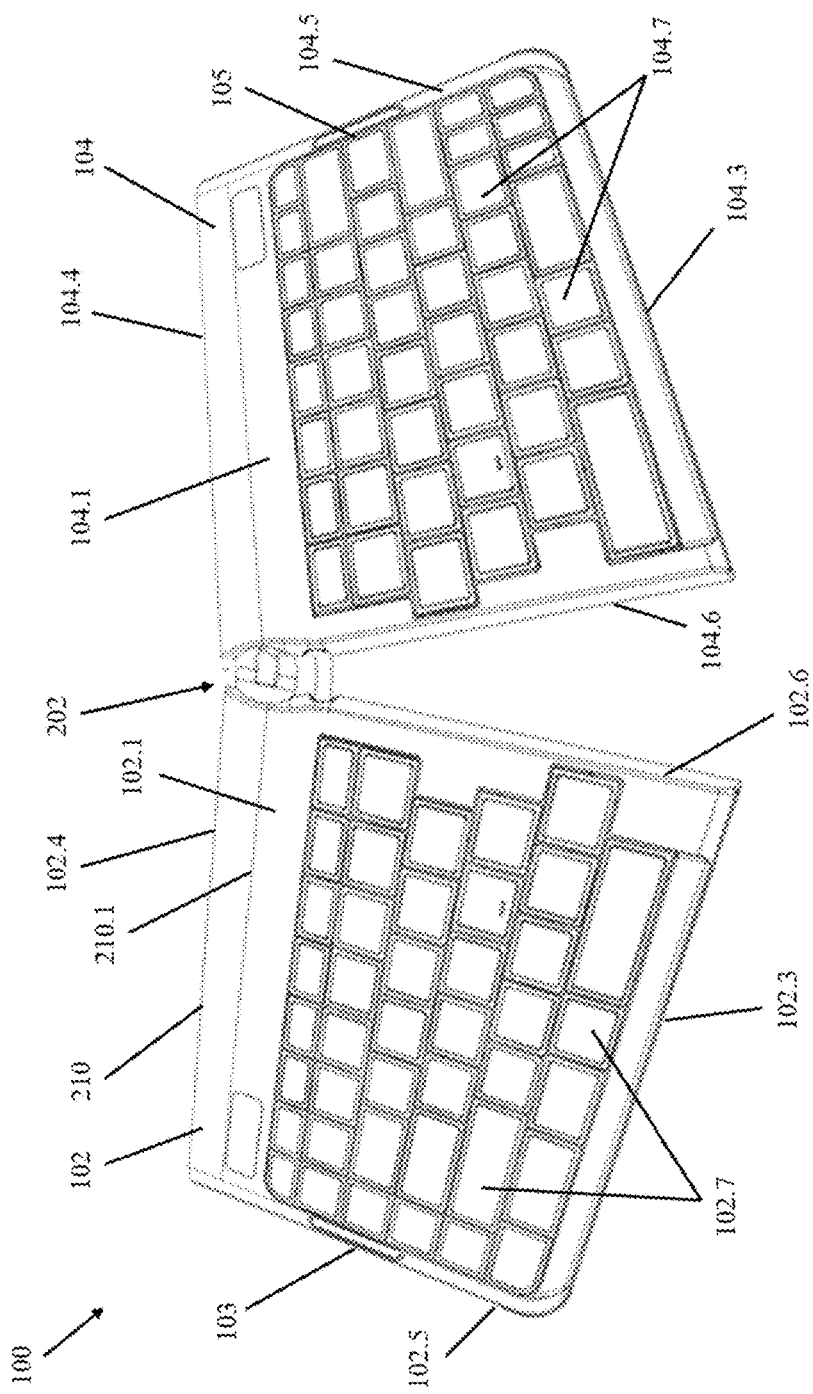
FIG. 7c is a perspective view illustrating an embodiment of the keyboard input system FIGS. 1a and 1b with the first and second portions in a tented and splayed orientation.

In another example, a tented and splayed side-by-side orientation is illustrated in FIG. 7c in which the first base portion 102 and the second base portion 104 are positioned side-by-side with the inner side edges 102.6 and 104.6 non-parallel and at an angle (similar to $\ominus_{SPLAY}$, illustrated in FIG. 3A) to each other, and with the top surfaces 102.1 and 104.1 at an angle (similar to $\ominus_{TENT}$, illustrated in FIG. 7b) to each other.

Figure 2G:
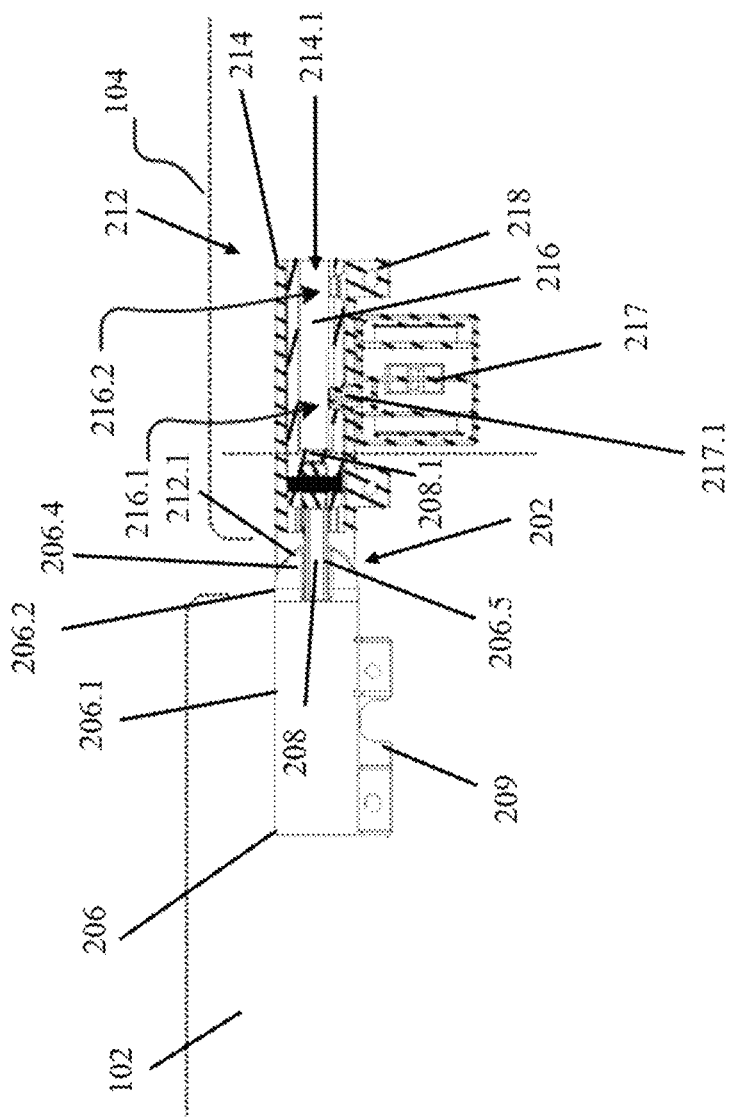
FIG. 2g is a partial cross-sectional view illustrating an embodiment of the manipulation mechanism of FIG. 2a with a moveable coupling stowed.
Figure 2H:
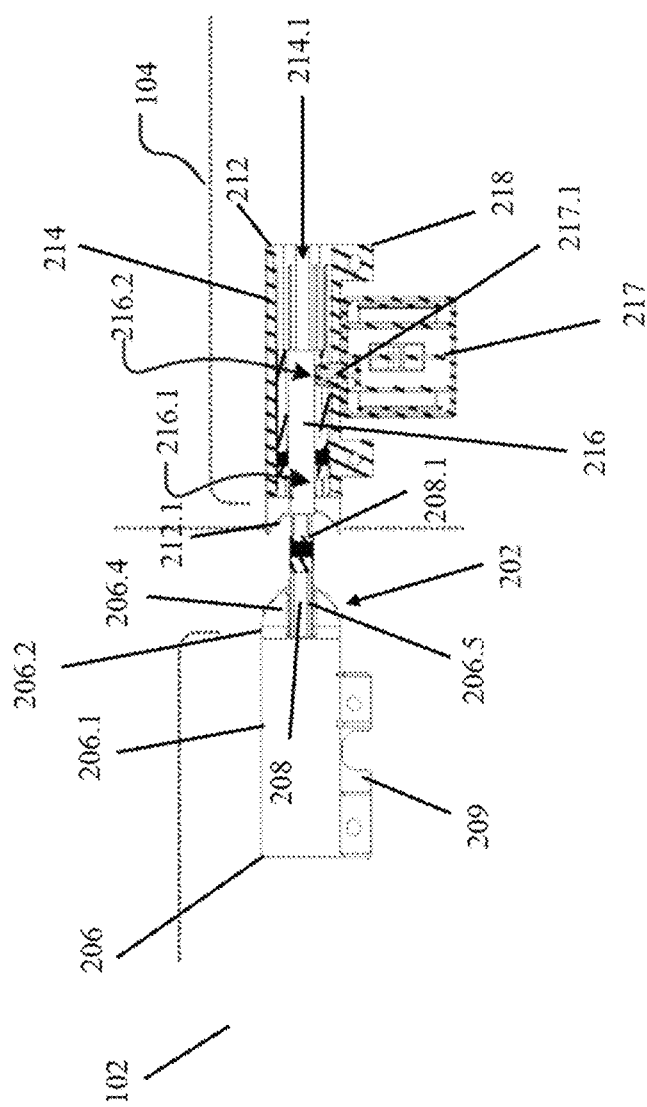
FIG. 2h is a partial cross-sectional view illustrating an embodiment of the manipulation mechanism of FIG. 2a with a moveable coupling extended.

In the embodiments illustrated in FIGS. 1a, 7a, 7b, and 7c, the side-by-side orientation is held by the first moveable coupling locking system, discussed above, such that movement of the first base portion 102 relative to the second base portion 104 about the first moveable coupling 202 is resisted (e.g., through frictional engagement between the locking engagement surfaces (e.g., locking engagement surfaces 206.6 and 212.2, or locking engagement surfaces 304.2 and 308.1)). In embodiments that include the second moveable coupling 204, that second moveable coupling 204 is in a stowed position within the channel 214a defined by the stowing housing 214, as also illustrated in FIGS. 2a and 2g. As illustrated in FIG. 2g, in the stowed position, the locking member 217.1 on the locking system 217 is positioned in the locking aperture 216.1 to resist movement of the second moveable coupling 204 out of the channel 214.1. Furthermore, the second moveable coupling 204 may be immobilized when located in the channel 214.1, as movement of the first base portion 102 and the second base portion 104 about the second moveable coupling 204 is resisted due to the inability of the second moveable coupling 204 to rotate due to being constrained by the walls of the stowing housing 214.

Figure 5A:
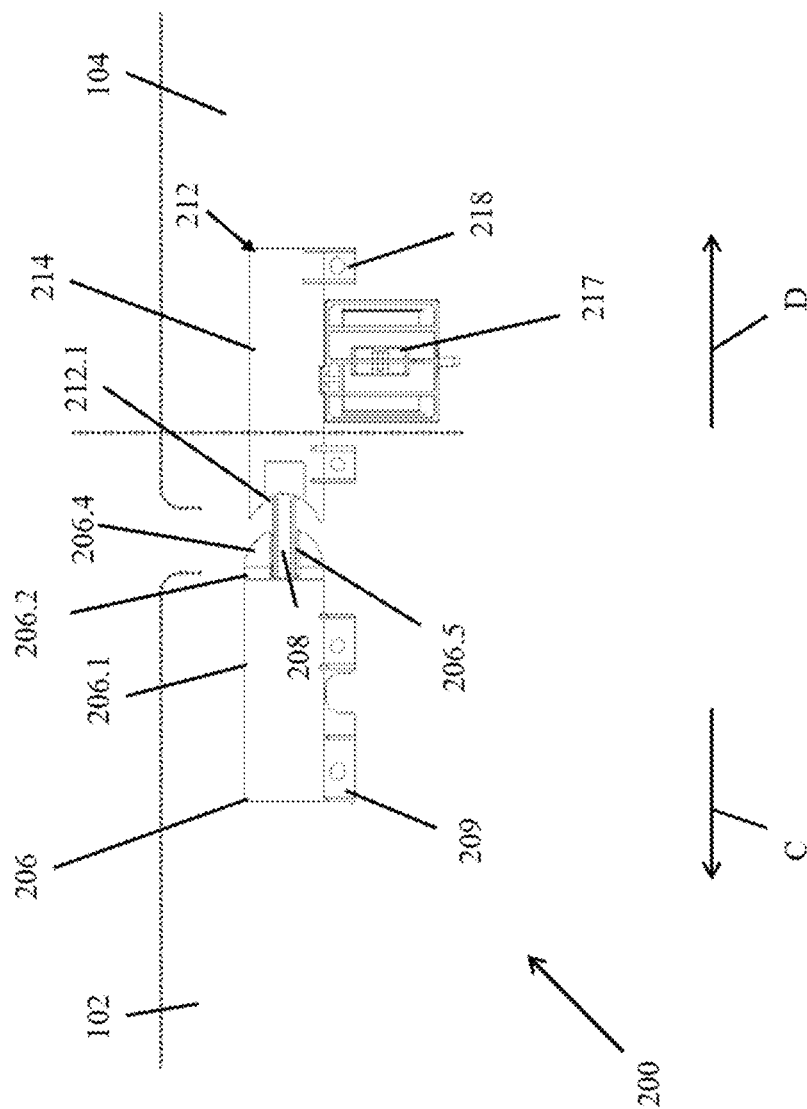
FIG. 5a is a side view illustrating an embodiment of the manipulation mechanism of FIG. 2a being unlocked.
Figure 5B:
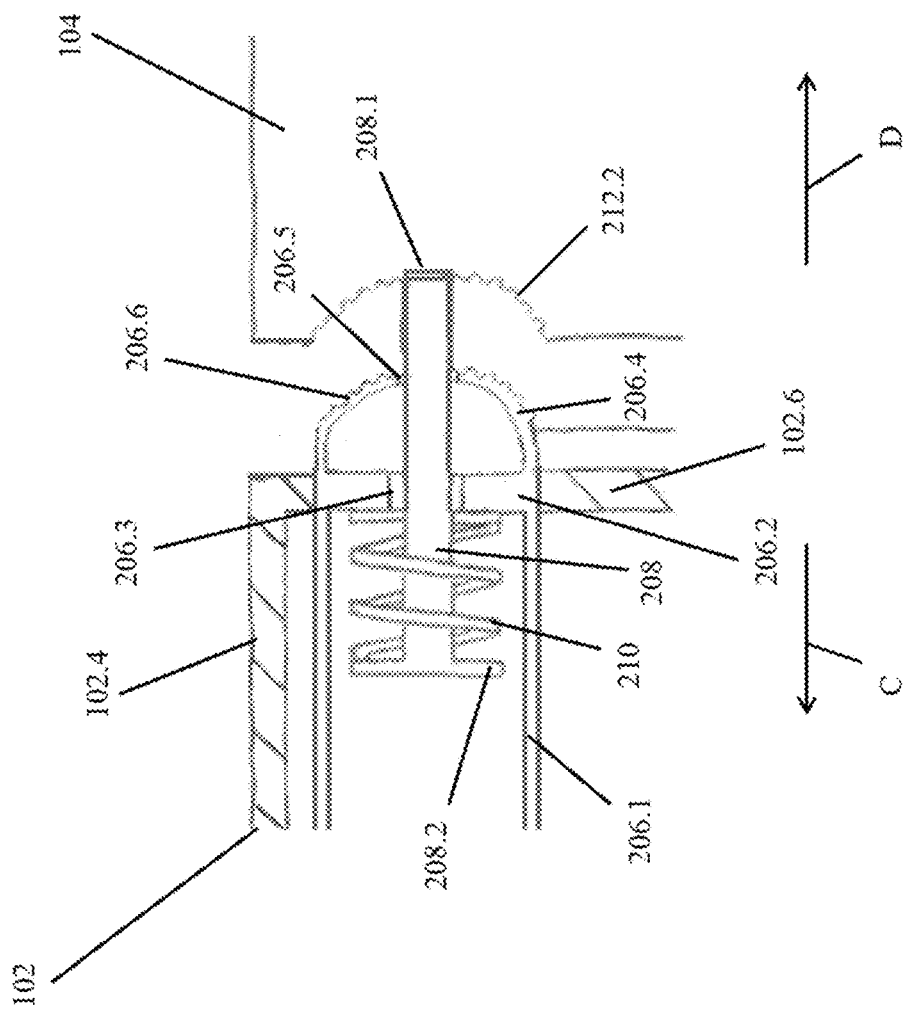
FIG. 5b is a partial cross-sectional view illustrating an embodiment of the manipulation mechanism of FIG. 2a being unlocked.

The method 400 then proceeds to block 404 where the first moveable coupling is unlocked. Referring first to the embodiment illustrated in FIGS. 2a-f, 5a, and 5b, a user may grasp each of the first base portion 102 and the second base portion 104 of the input system 100 (e.g., while the biasing member 210 is biasing the hemispherical projection 206.4 into the socket 212.1 to resist movement of the first base portion 102 relative to the second base portion 104), and provide unlocking forces on the first base portion 102 and the second base portion 104 in opposite directions C and D, illustrated in FIGS. 5a and 5b, to overcome the biasing force and disengage the hemispherical projection 206.4 from the socket 212.1, as illustrated in FIGS. 5a and 5b. With the hemispherical projection 206.4 disengaged from the socket 212.1, the locking engagement surfaces 206.6 and 212.2 disengage, allowing relative movement of the first base portion 102 and the second base portion 104 about the first moveable coupling 202.

Figure 6:
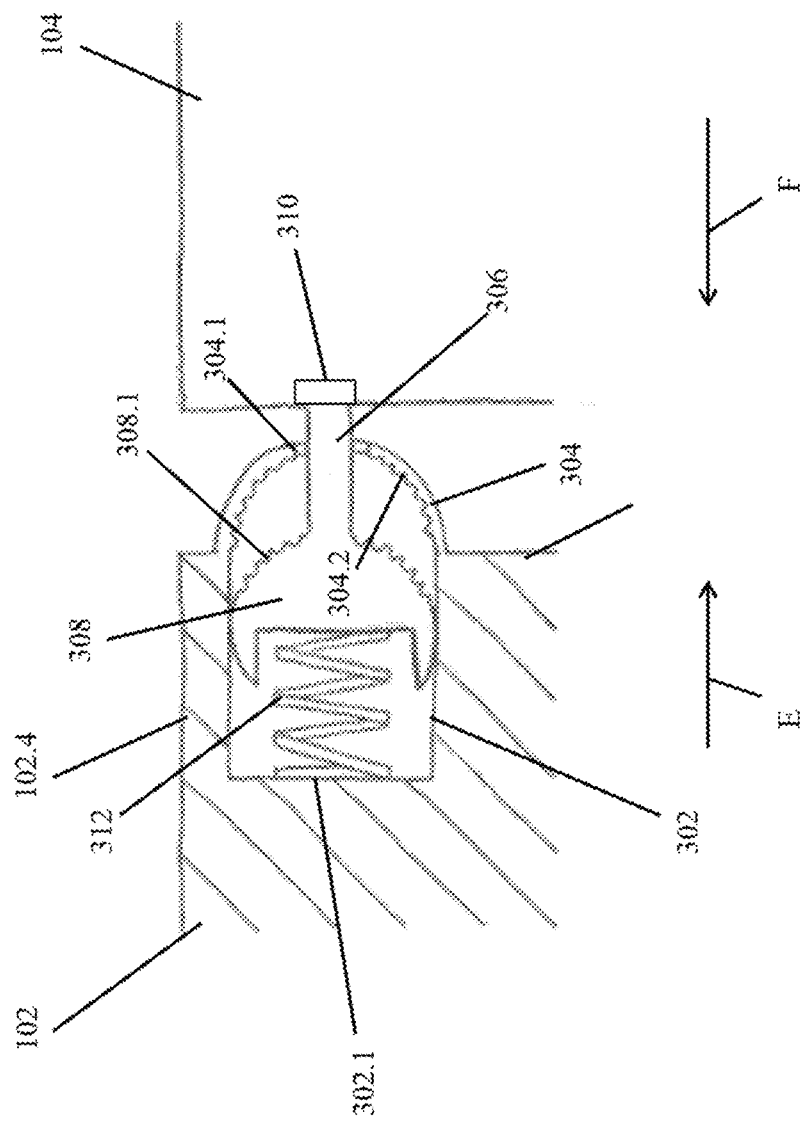
FIG. 6 is a partial cross-sectional view illustrating an embodiment of the manipulation mechanism of FIG. 3a being unlocked.

Referring next to the embodiment illustrated in FIGS. 3a-d, and 6, a user may grasp each of the first base portion 102 and the second base portion 104 of the input system 100 (e.g., while the biasing member 312 is biasing the ball joint 308 into the hemispherical projection 304 to resist movement of the first base portion 102 relative to the second base portion 104), and provide unlocking forces on the first base portion 102 and the second base portion 104 in opposite directions E and F, illustrated in FIG. 6, to overcome the biasing force and disengage the ball joint 308 from the hemispherical projection 304, as illustrated in FIG. 6. With the ball joint 308 disengaged from the hemispherical projection 304, the locking engagement surfaces 304.2 and 308.1 disengage, allowing relative movement of the first base portion 102 and the second base portion 104 about the first moveable coupling 202.

The method 400 then proceeds to block 306 where the first base portion is moved relative to the second base portion and into a desired orientation. As discussed above with reference to block 404, as long as the user is disengaging the locking engagement surfaces (e.g., locking engagement surfaces 206.6 and 212.2, or locking engagement surfaces 304.2 and 308.1), the user may move the first base portion 102 relative to the second base portion 102 and into any desired ergonomic orientation. FIG. 7a illustrates an embodiment of how the unlocked first moveable coupling 202 provides for a splaying range of motion $\ominus_{SPLAY}$ by allowing relative movement of the first base portion 102 and the second base portion 104 about a splaying axis $S_{AXIS}$ that coincides with the rotational axis of the first moveable coupling 202 and that comes out of the page of the drawing illustrated in FIG. 7a. Thus, from the unsplayed orientation illustrated in FIG. 1a, the first base portion 102 and the second base portion 104 may be moved relative to each other about the splaying axis $S_{AXIS}$ such that the first base portion 102 and the second base portion 104 are provided in the splayed orientation illustrated in FIG. 7a. FIG. 7b illustrates an embodiment of how the unlocked first moveable coupling 202 also provides for a tenting range of motion $\ominus_{TENT}$ by allowing relative movement of the first base portion 102 and the second base portion 104 about a tenting axis $T_{AXIS}$ that coincides with the rotational axis of the first moveable coupling 202 and that comes out of the page of the drawing illustrated in FIG. 7b. Thus, from the flat or untented orientation illustrated in FIG. 1a (e.g., when the top surface 102.1 of the first base portion 102 is substantially co-planar with the top surface 104.1 of the second base portion 104), the first base portion 102 and the second base portion 104 may be moved relative to each other about the tenting axis $T_{AXIS}$ such that the first base portion 102 and the second base portion 104 are provided in the tented orientation illustrated in FIG. 7b.

As discussed above, the first moveable coupling 202 provides for relative movement of the first base portion 102 and the second base portion 104 into a variety of tented and splayed orientations, such as the tented and splayed orientation illustrated in FIG. 7c, and one of skill in the art will recognize that the splaying range of motion $\ominus_{SPLAY}$ and the tenting range of motion $\ominus_{TENT}$ illustrated in FIGS. 7a and 7b provide for those varieties of tented and splayed orientations such that the input system 100 may be positioned ergonomically for a wide variety of users. For example, the splaying range of motion $\ominus_{SPLAY}$ between an the unsplayed orientation and a fully splayed orientation (e.g., to the limits of the first moveable coupling 202) may be approximately 20 degrees, while the tenting range of motion $\ominus_{TENT}$ between an untented orientation and a fully tented orientation (e.g., to the limits of the first moveable coupling 202) may be approximately 40 degrees.

The method 400 may then proceed to block 408 where the first moveable coupling is locked. Once the first base portion 102 and the second base portion 104 are positioned in the desired orientation in block 406, the user may simply release the unlocking force (e.g., at least one of the forces on the first and second base portions 102, 104 in the directions C and D, illustrated in FIGS. 5a and 5b, or at least one of the forces on the first and second base portions 102, 104 in the directions E and F, illustrated in FIG. 6). Referring first to FIGS. 2a, 2f, 5a, and 5b, release of the unlocking force causes the hemispherical projection 206.4 to be biased back into the socket 212.1 by the biasing member 210 such that the locking engagement surfaces 206.6 and 212.2 engage and again operate to resist relative movement of the first base portion 102 and the second base portion 104. Referring next to FIGS. 3a and 6, release of the unlocking force causes the ball joint 308 to be biased back into the hemispherical projection 304 by the biasing member 312 such that the locking engagement surfaces 308.1 and 304.2 engage and again operate to resist relative movement of the first base portion 102 and the second base portion 104. Thus, as discussed above, the first moveable coupling 202 may be locked in any of the tented, splayed, or tented and splayed orientation provided by the first moveable coupling 202 such that any movement of the first base portion 102 and the second base portion 104 relative to each other about the first moveable coupling 202 is resisted.

Referring now to FIGS. 8, 9a, 9b, 9c, 9d, 9e, and 9f, an embodiment of a method 500 for providing an input system is illustrated that describes a sequence of manipulations and configuration changes for the input system introduced in FIGS. 1a and 1b that allow a user to transition the input system from a side-by-side, deployed configuration to a folded over or stacked configuration that is suitable for travel or storage. Specifically, in the illustrated folded over or stacked configuration of FIG. 9f, a protective clamshell is provided for the input devices (e.g., keys, touch devices, and/or displays on the first base portion 102 and the second base portion 104).

Figure 8:
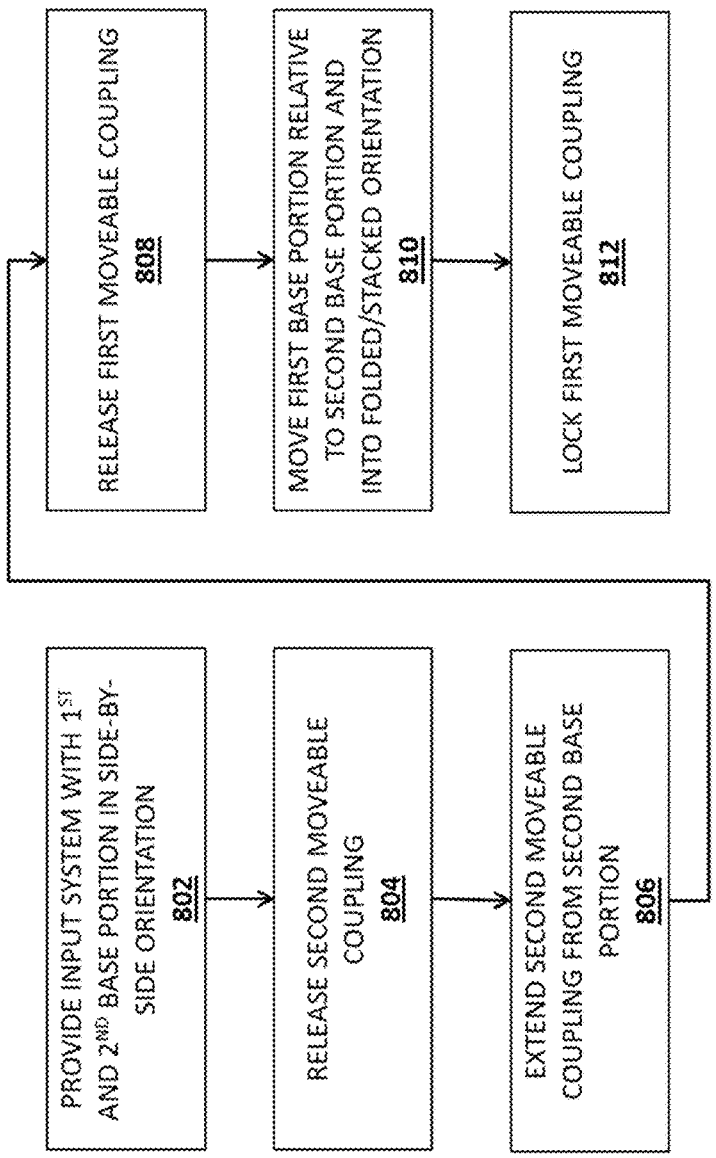
FIG. 8 is a flow chart illustrating an embodiment of a method for providing a keyboard input system.
Figure 9A:
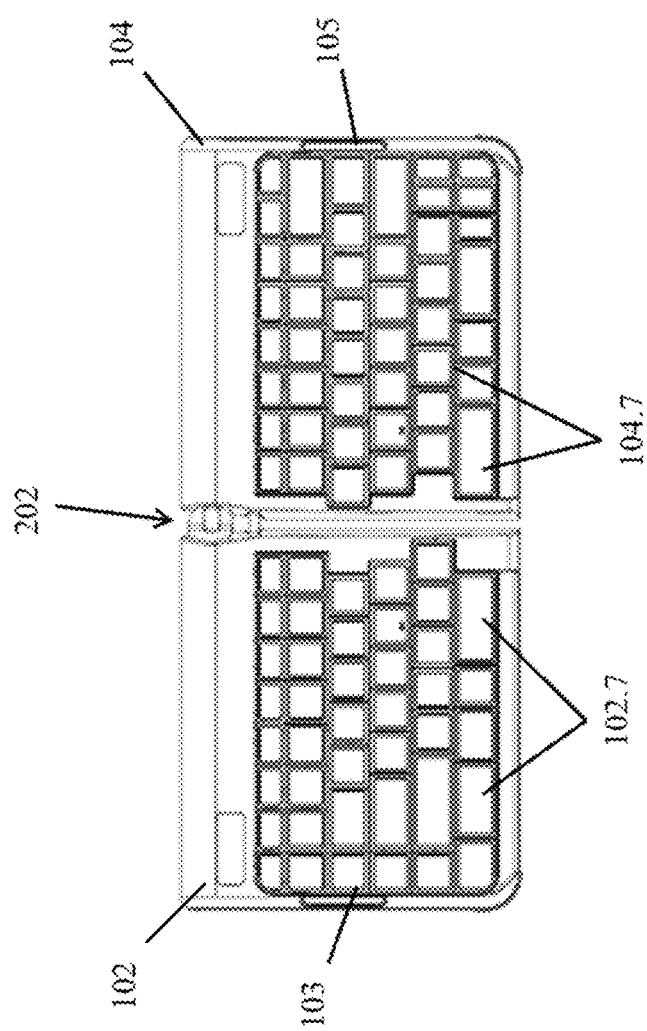
FIG. 9a is a top view illustrating an embodiment of the keyboard input system of FIGS. 1a and 1b with the first and second portions in an unfolded or unstacked orientation, an untented orientation, and an unsplayed orientation.

Referring now to FIGS. 8 and 9a, the method 800 begins at block 802 where the input system 100 is provided with the first based portion 102 and the second base portion 104 in a side-by-side orientation. The first base portion 102 and the second base portion 104 may be provided in a variety of different side-by-side orientations in which the input device(s) on the first base portion 102 and the second base portion 104 are presented to a user for keyboarding, as discussed in detail above. Thus, FIG. 9a illustrates but one of the plurality of side-by-side orientations of the input system 100.

Figure 9B:
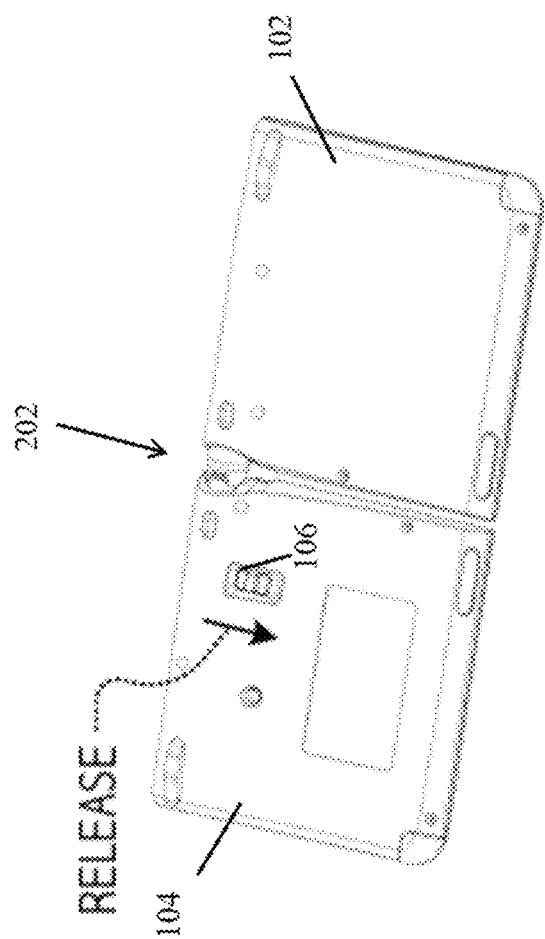
FIG. 9b is a bottom view illustrating an embodiment of the keyboard input system of FIGS. 1a and 1b, an in particular, the release of a latch to allow a moveable coupling on the manipulation mechanism to extend from one of the first and second portions.

Referring now to FIGS. 8 and 9b, the method 800 then proceeds to block 804 where the second moveable coupling 202 is released. In the illustrated embodiment, a user may actuate the second moveable coupling lock release member 106 (e.g., in the RELEASE direction illustrated in FIG. 9b) to move the locking system 217 such that the locking member 217.1 moves out of the locking aperture 216.1 (e.g., see FIGS. 2g and 2h and the related description.) Moving the locking member 217.1 out of the locking aperture 216.1 frees the base 216 to move relative to the stowing housing 214 and through the channel 214a.

Figure 9C:
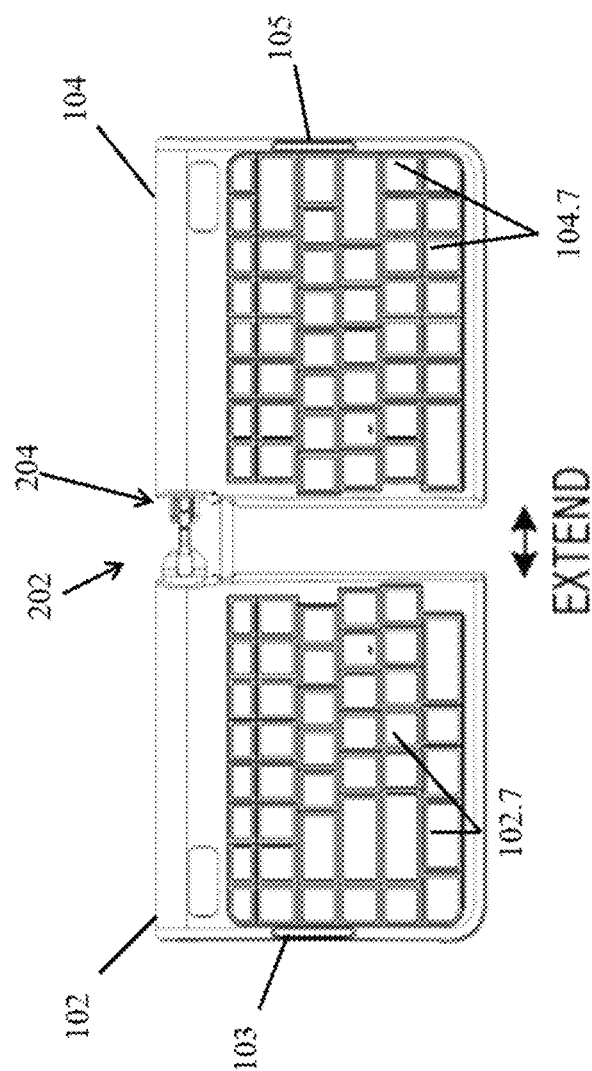
FIG. 9c is a top view illustrating an embodiment of the keyboard input system of FIGS. 1a and 1b including a moveable coupling on the manipulation mechanism extended from one of the first and second portions.
Figure 9D:
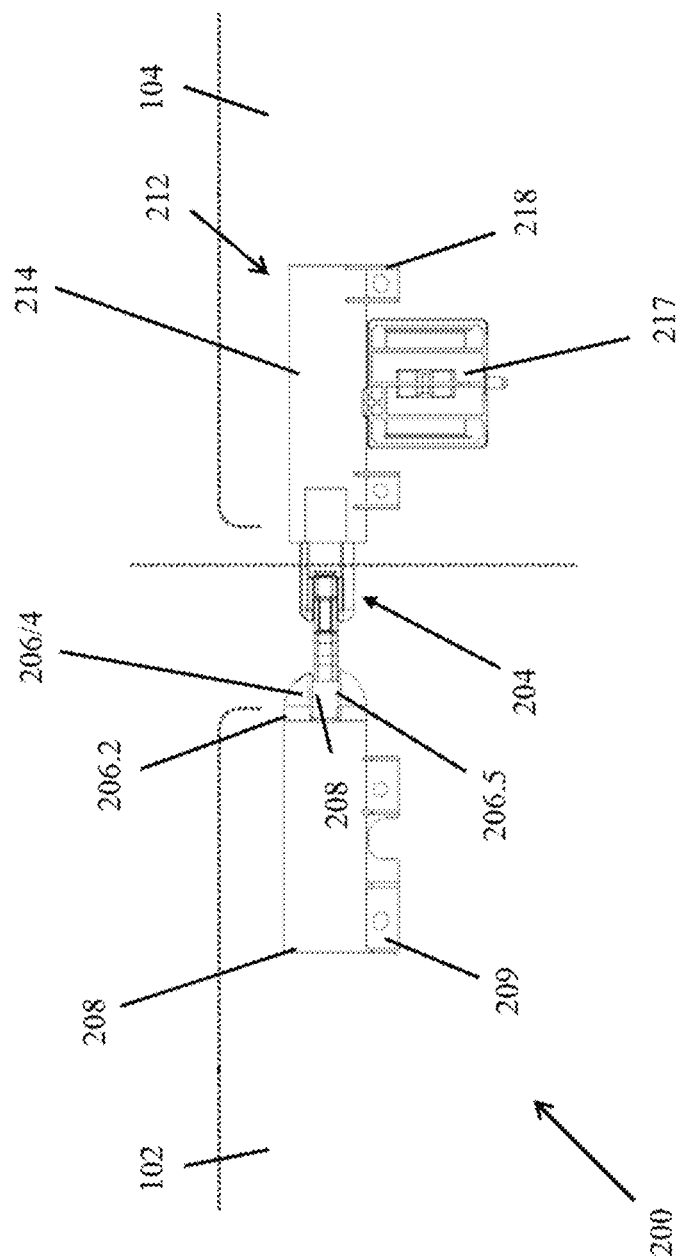
FIG. 9d is a side view illustrating an embodiment of manipulation mechanism of FIG. 2a including a moveable coupling on the manipulation mechanism extended.

Referring now to FIGS. 8, 9c, and 9d, the method 800 then proceeds to block 806 where the second moveable coupling 204 is extended from the second base portion 104. With the base 216 free to move relative to the stowing housing 214 and through the channel 214a (see FIGS. 2g and 2h), the first base portion 102 and the second base portion 104 may be moved relative to each other and away from each other (e.g., in the EXTEND direction illustrated in FIG. 9c) such that the second moveable coupling 204 extends out of the channel 214a defined by the stowing housing 214, also illustrated in FIGS. 9c and 9d. As can be seen in FIGS. 9c and 9d, movement of the base 216 relative to the stowing housing 214 and through the channel 214a to cause the second moveable coupling 204 to extend from the channel 214a causes the locking member 217.1 on the locking system 217 to be biased into the locking aperture 216.2. Positioning of the locking member 217.1 in the locking aperture 216.2 secures the second moveable coupling 204 in the extended position out of the channel 214a and resists movement of the second moveable coupling 204 back into the channel 214a. However, a user may position the second moveable coupling 204 back in the channel 214a by actuating the second moveable coupling lock release member 106 such that the locking member 217.1 moves out of the locking aperture 216.2, and then moving the base 216 and second moveable coupling 204 relative to the stowing housing 214 and back into the channel 214*a*. In embodiments that utilize first moveable coupling locking systems like those illustrated in FIGS. 2*a-h*, the biasing force provided by the biasing member 210 may be selected so that movement of the second moveable coupling 204 out of the stowing housing 214, as discussed above, does not disengage the hemispherical projection 206.4 and the socket 212.1.

Referring now to FIG. 8, the method 800 then proceeds to block 808 where the first moveable coupling 202 is released. As discussed above, in the illustrated embodiment, the initial side-by-side orientation provides the first moveable coupling locking system locked such that movement of the first base portion 102 relative to the second base portion 104 about the first moveable coupling 202 is resisted (e.g., through frictional engagement between the locking engagement surfaces 206.6 and 212.2, or locking engagement surfaces 304.2 and 308.1). At block 808, the user may unlock the first moveable coupling in substantially the same manner as discussed above with reference to block 404 of the method 400 (e.g., by providing an unlocking force that overcomes the biasing force locking the first moveable coupling 202).

Figure 9E:
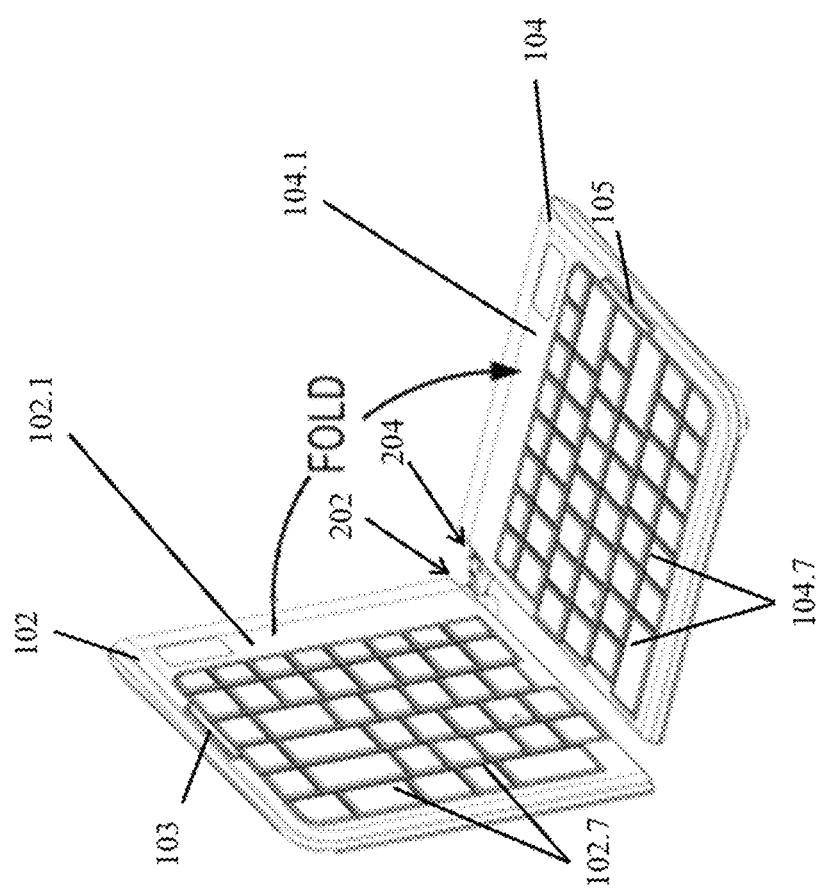
FIG. 9e is a perspective view illustrating an embodiment of the keyboard input system of FIGS. 1a and 1b including the first and second portions moving relative to each other and into a folded or stacked orientation.
Figure 9F:
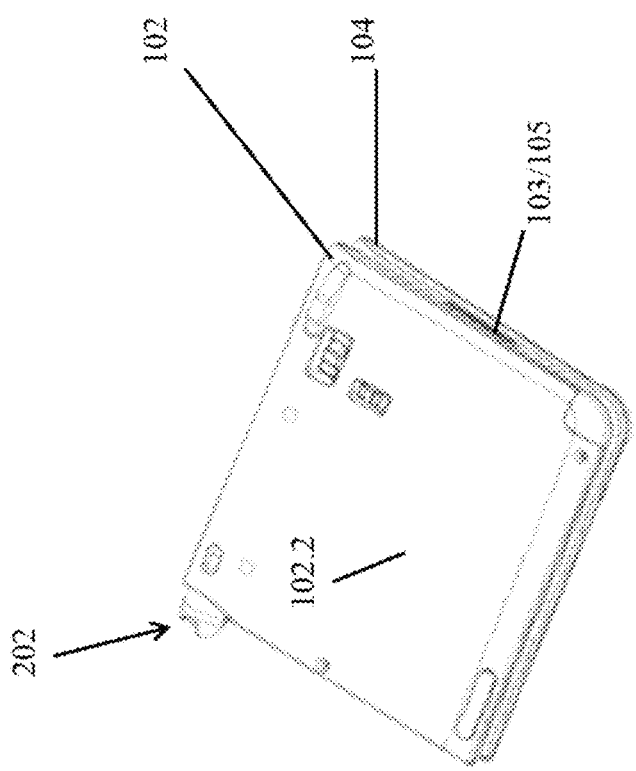
FIG. 9f is a perspective view illustrating an embodiment of the keyboard input system of FIGS. 1a and 1b with the first and second portions being locked in a folded or stacked orientation.

Referring now to FIGS. 8, 9*e*, and 9*f*, the method 800 then proceeds to block 810 where the first base portion 102 is moved relative to the second base portion 104 and into a folded or stacked orientation. With the second moveable coupling 204 extended from the second base portion 104, and the first moveable coupling 102 released as discussed with reference to block 808, the first base portion 102 may be moved relative to the second base portion 104 (e.g., about the FOLD direction illustrated in FIG. 9*e*) until the top surface 102.1 on the first base portion 102 is located immediately adjacent the top surface 104.1 on the second base portion 104, as illustrated in FIG. 9*f*. In an embodiment, movement of the first base portion 102 relative to the second base portion 104 at block 810 includes movement about the first moveable coupling 202 and movement about the second moveable coupling 204. For example, the first base portion 102 may rotate relative to the second base portion 104 by approximately 90 degrees about a first folding/stacking axis provided by the first moveable coupling 202, and the first base portion 102 may rotate relative to the second base portion 104 by approximately 90 degrees about a second folding/stacking axis provided by the second moveable coupling 204, to provide approximately 180 degrees of rotation between the side-by-side orientation and the folded or stacked orientation. However, one of skill in the art will recognize that movement of the first base portion 102 relative to the second base portion 104 and about the first moveable coupling 202 and the second moveable coupling 206 may vary from that discussed above while still remaining within the scope of the present disclosure to provide the first base portion 102 and the second base portion 104 in the folded or stacked orientation.

As illustrated, the folded or stacked orientation provides the first base portion 102 and the second base portion 104 folded (relative to their side-by-side orientation in which the input devices 102.7 and 104.7 are presented to a user) and stacked, one on top of the other, to provide a compact size for the input system 100. In the illustrated embodiment, the folded and stacked orientation provides the top surfaces 102.1 and 104.1, and thus the input devices 102.7 and 104.7, facing each other and protected by the bottom surfaces 102.2 and 104.2 in a clamshell configuration. As discussed above, the mating surface 103 on the first base portion 102 and the mating surface 105 on the second base portion 104 may engage each other when the first base portion 102 and the second base portion 104 are in the folded or stacked orientation to prevent input device events causes by, for example, depressing of keys. Furthermore, as discussed above, the mating surface 103 and/or the mating surface 105 may be provided by features that further provide a folded/stacked orientation securing system that resists relative movement of the first base portion 102 and the second base portion 104 when in the folded or stacked orientation. For example, the features that provide the mating surfaces 103 and 105 may include latch features, magnets, an or other catch system devices that secure to each other and resist the unfolding of the stacked first base portion 102 and second base portion 104.

Referring now to FIG. 8, the method 800 then proceeds to block 812 where the first moveable coupling 202 is locked. At block 812, the user may lock the first moveable coupling in substantially the same manner as discussed above with reference to block 408 of the method 400 (e.g., by no longer providing the unlocking force and allowing the biasing force to again lock the first moveable coupling 202).

Figure 10A:
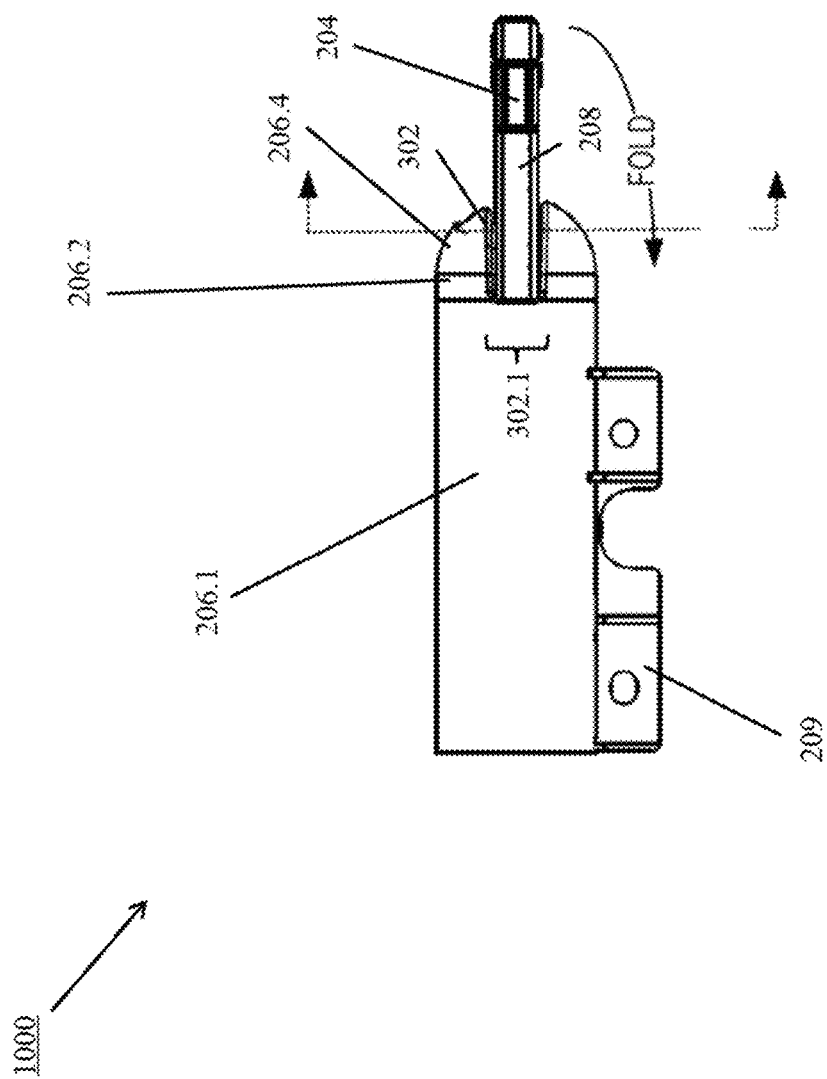
FIG. 10a is a side view illustrating an embodiment of a manipulation mechanism that provides movement through a moveable coupling and a constraining window.
Figure 10B:
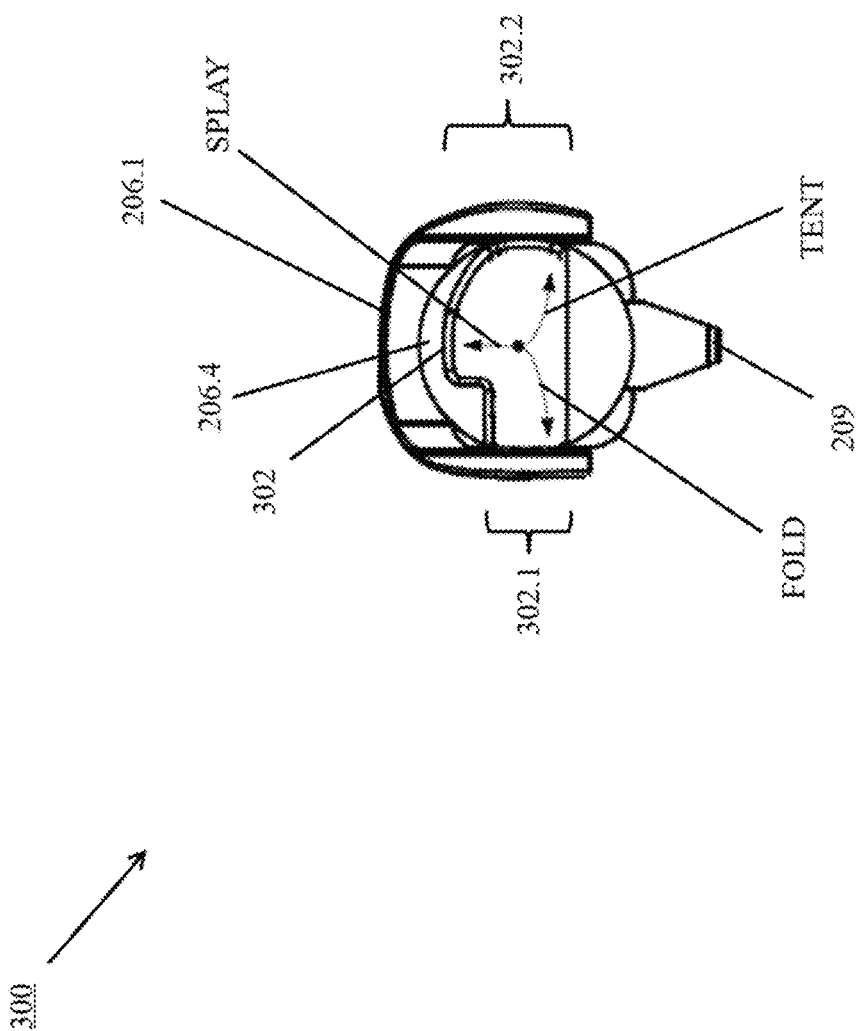
FIG. 10b is a front view illustrating an embodiment of a manipulation mechanism that provides movement through a moveable coupling and a constraining window.
Figure 10C:
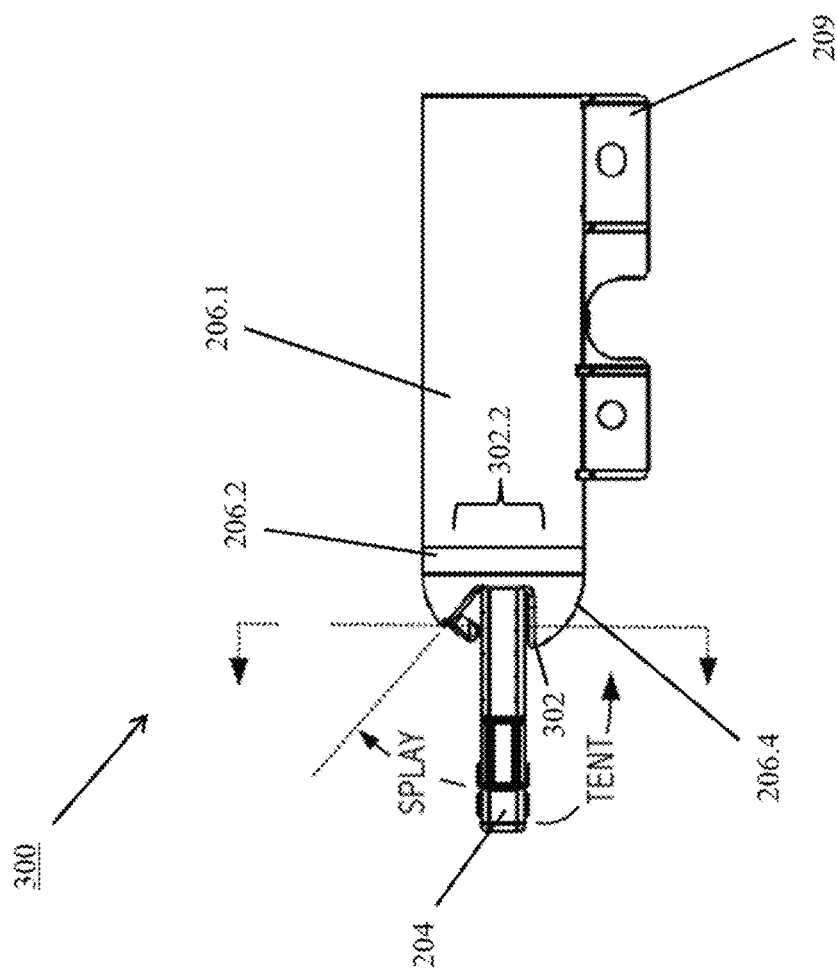
FIG. 10c is a side view illustrating an embodiment of a manipulation mechanism that provides movement through a moveable coupling and a constraining window.

Referring now to FIGS. 10*a*, 10*b* and 10*c*, embodiments of the first moveable coupling 1000 are illustrated that detail the movement allows by the first moveable coupling to allow tenting, splaying, combinations thereof, and folding for the first base portion 102 and the second base portion 104. Specifically, the embodiments illustrated in FIGS. 10*a-c* provide an example of the movement of the first manipulation mechanism section 206, but one of skill in the art will recognize that movement of the first manipulation mechanism section 300 may be provided in a similar manner. Furthermore, these embodiments are but one of a variety of first moveable coupling mechanisms that support, in addition to tenting and splaying manipulations, rotational degrees of freedom that facilitate the aforementioned foldover operations. The embodiments of FIGS. 10*a-c* provide the above discussed functionality by providing the pivotable arm 208 through a motion constraining window 302 (which may be the first pivotable arm passageway 206.5) that is configured to restrict rotational freedom in a manner consistent with desired operations and manipulations described and illustrated herein.

The first moveable coupling 1000 is described above with reference to the first rotational coupling 202 and associated locking system, and similar reference numbers are used for similar features. FIGS. 10*a* and 10*c* provide opposing sides of the first moveable coupling 1000, while FIG. 10*b* provides a front view of the first moveable coupling 1000 with the pivotable arm 208 removed. Viewed in combination, FIGS. 10*a*, 10*b*, and 10*c* show the motion constraining window 302 that provides the range of motion discussed above to enable the tented, splayed, tented and splayed, and folded or stacked orientations of the first base portion 102 and the second base portion 104. Specifically, FIGS. 10*a* and 10*b* illustrate a folding portion 302.1 of the motion constraining window 302 that is configured to allow the piovotable arm 208 to move in FOLD direction that restricts movement of the first base portion 102 relative to the second base portion 104 in a single plane about a single axis. Specifically, in the illustrated embodiment, the folding portion 302.1 of the window 302 is substantially the same width as the pivotable arm 208, restricting the movement of the piovotable arm 208 through the folding portion 302.1 of the window 302 is substantially one direction. Thus, in an embodiment, given the single plane/single axis rotation provided by the second moveable coupling 204, along with the single plane-single axis rotation provided by the folding portion 302.1 of the window 302, relative movement of the first base portion 102 and the second base portion 104 into the folded or stacked orientation may be constrained to a single rotational plane.

FIGS. 10b and 10c illustrated a tenting and splaying portion 302.2 of the motion constraining window 302 that is configured to allow the pivotable arm 208 to move in the TENT and SPLAY directions that allow movement of the first base portion 102 relative to the second base portion 104 to provide the tented, splayed, and tented and splayed orientations discussed above. Specifically, in the illustrated embodiment, the tenting and splaying portion 302.2 of the window 300 begins as a stepped increase in the width of the window 302 following the end of the folding portion 302.1, with the tenting and splaying portion 302.2 of the window 300 then gradually reducing in width along a curve. Thus, while the second moveable coupling 204 along with the folding portion 302.1 of the window 302 may operate to constrain relative movement of the first base portion 102 and the second base portion 104 to the folded or stacked orientation in a single rotational plane, once the pivotable arm 208 leaves the folding portion 302.1 of the window 302 and enters the tenting and splaying portion 302.2 of the window 302, multiple rotational degrees of freedom are provided that allow relative movement unconstrained to a single rotational plane (e.g., tenting, splaying, or tenting and splaying.)

Thus, systems and methods have been described that provide an input system that may be intuitively and easily locked and unlocked to allow for adjustment of the input system into any of a variety of desired ergonomic orientations. Furthermore, the input system may also be folded or stacked into a compact configuration for storage and/or travel, and then unfolded/unstacked to position that input system in a tented orientation, a splayed orientation, or a tenting and splayed orientation for ergonomic use.

Figure 11A:
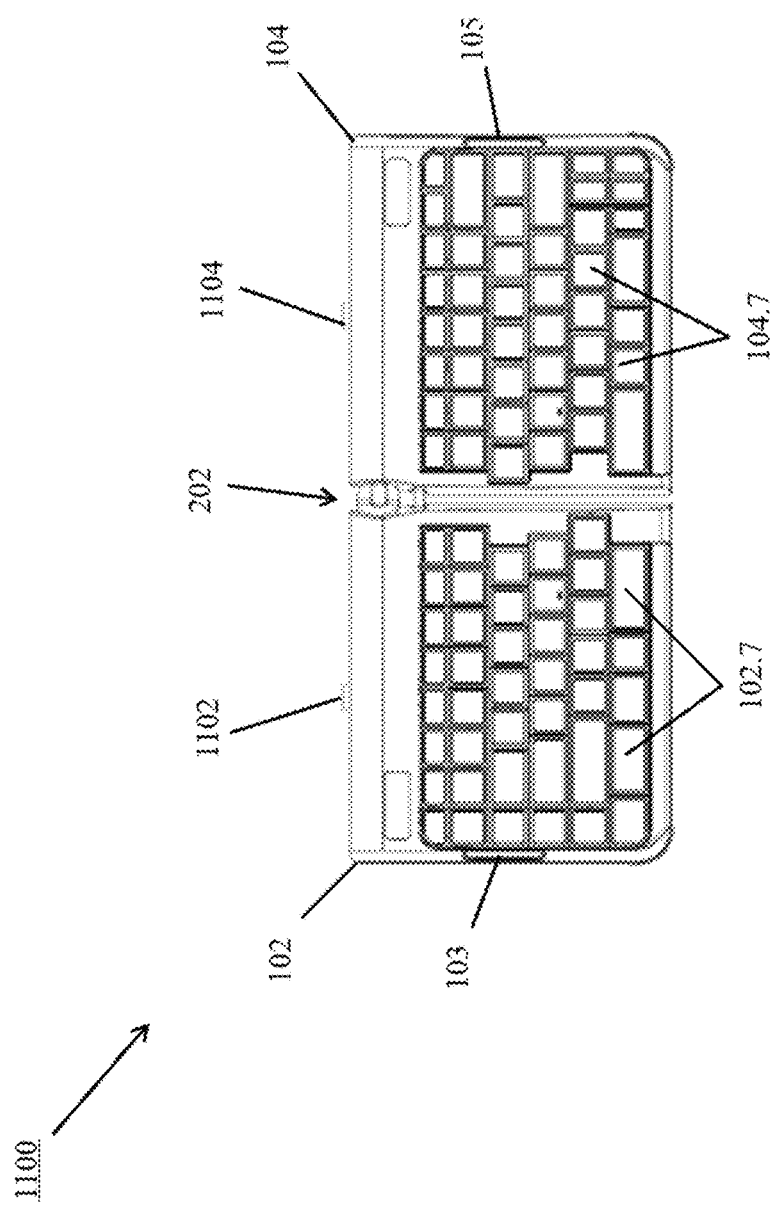
FIG. 11a is a top view illustrating an embodiment of the keyboard input system prior to an ergonomic adjustment of the first portion and second portion of the keyboard input system.
Figure 11B:
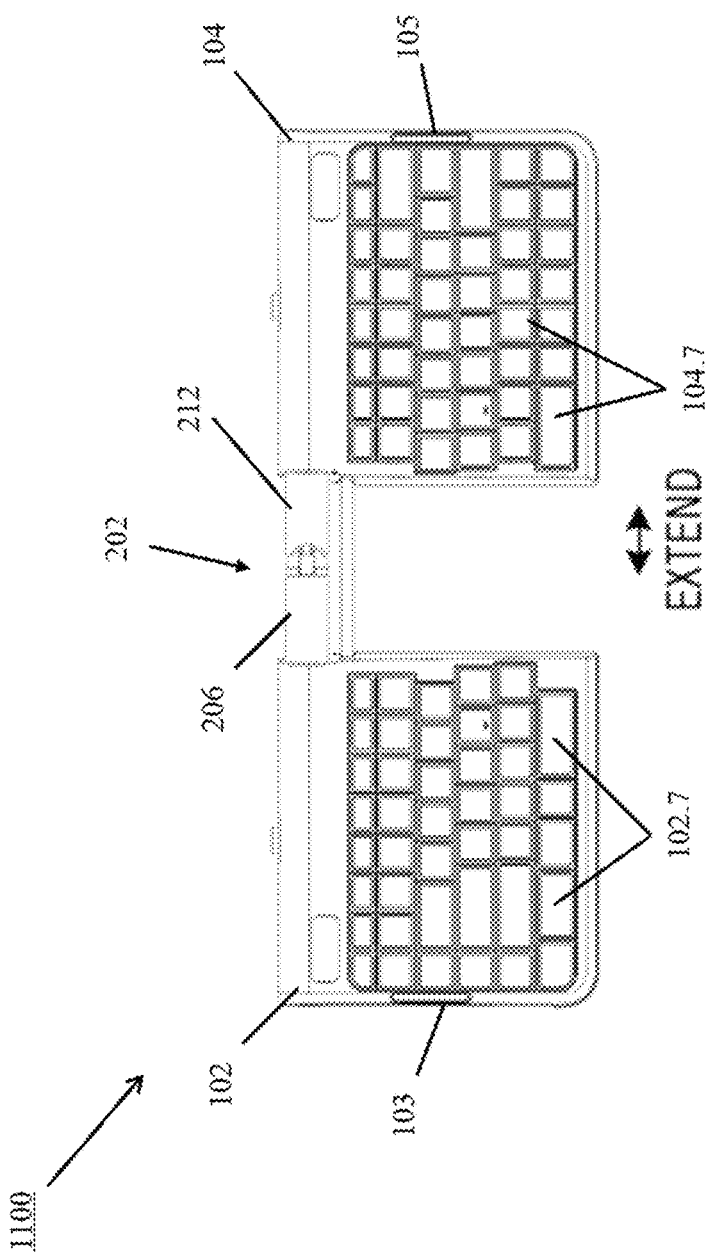
FIG. 11b is a top view illustrating an embodiment of the keyboard input system subsequent to an ergonomic adjustment of the first portion and second portion of the keyboard input system to increase the distance between the first portion and the second portion.

Referring now to FIGS. 11a and 11b, an embodiment of an input system 1100 is illustrated that is substantially similar to the inputs systems discussed above but that includes features that provide for an ergonomic adjustment of the first base portion 102 and the second base portion 104 to move the first base portion 102 away from the second base portion 104 for users with a wider hand placement during input operations. Referring to FIG. 5a above, the first manipulation mechanism section 206 and the second manipulation mechanism section 212 may be moveably coupled to the first base portion 102 and the second base portion 104, respectively, using methods known in the art. A first slide release button 1102 is configured to engage the first base portion 102 and the first manipulation mechanism 206 to restrict relative movement of the first base portion 102 and the first manipulation mechanism 206, and a second slide release button 1104 is configured to engage the second base portion 104 and the second manipulation mechanism 212 to restrict relative movement of the second base portion 104 and the second manipulation mechanism 212. Furthermore, the first slide release button 1102 is configured to be actuated to disengage either or both of the first base portion 102 and the first manipulation mechanism 206 to allow relative movement of the first base portion 102 and the first manipulation mechanism 206, and the second slide release button 1104 is configured to be actuated to disengage either or both of the second base portion 104 and the second manipulation mechanism 212 to allow relative movement of the second base portion 104 and the second manipulation mechanism 212. For example, in FIG. 11a, the first slide release button 1102 is engaging the first base portion 102 and the first manipulation mechanism 206 to restrict relative movement of the first base portion 102 and the first manipulation mechanism 206, and the second slide release button 1104 is engaging the second base portion 104 and the second manipulation mechanism 212 to restrict relative movement of the second base portion 104 and the second manipulation mechanism 212, and the input system 1100 may be used substantially as discussed above (i.e., manipulated into the tented and/or splayed orientations).

Referring now to FIG. 11b, a user has actuated the first slide release button 1102 to disengage either or both of the first base portion 102 and the first manipulation mechanism 206, and actuated the second slide release button 1104 to disengage either or both of the second base portion 104 and the second manipulation mechanism 212, and moved the first base portion 102 and the second base portion 104 relative to each other in the EXTEND direction to increase the distance between the first base portion 102 and the second base portion 104. The user may have then allowed the first slide release button 1102 to engage the first base portion 102 and the first manipulation mechanism 206 to restrict relative movement of the first base portion 102 and the first manipulation mechanism 206, and allowed the second slide release button 1104 to engage the second base portion 104 and the second manipulation mechanism 212 to restrict relative movement of the second base portion 104 and the second manipulation mechanism 212, such that the first base portion 102 and the second base portion 104 are secured in the position illustrated in FIG. 11b. In that position, the input system 1100 may be used substantially as discussed above (i.e., manipulated into the tented and/or splayed orientations). One of skill in the art in possession of the present disclosure will recognize in the extended position, the first manipulation mechanism 202 allows for a user with a "wide" hand placement to utilize the keyboard in the variety of ergonomic positions discussed above.

In some embodiments, the input system 100 includes input devices that are physical keys. However, because the input system 100 is limited in size to provide for compactness and portability, the number of physical keys is limited as well. In order to provide for full keyboard functionality with limited keys, one or more function keys are provided on the input system 100 to provide a key expansion function that allows at least a subset of the physical keys on the input system 100 to provide one than one input (e.g., with the key expansion function deactivated, a first key provides a first input, while with the key expansion function activated, that first key provides a second input that is different from the first input.) In one example, the input system 100 may include physical keys that input letters when the key expansion function is deactivated, while inputting numbers when the key expansion function is activated (e.g., a numeric keypad may be provided on a standard QWERTY keyboard such that the following alphanumeric keys provide the corresponding numbers when the key expansion function is activated: M=0, J=1, K=2, L=3, U=4, I=5, O=6, 7=7, 8=8, and 9=9).

In a specific embodiment, the input system 100 includes a Function key as well as a Number Lock key to provide a numeric keypad function that provides the numeric keypad using the standard QWERTY keyboard discussed above. For example, to activate the numeric keypad function on the input system 100, a user first activates the Function key (e.g., by depressing the Function key) and then selects the Number Lock key (e.g., by depressing the Number Lock key). Following activation of the numeric keypad function, the input system 100 gives the user two options to deactivate the numeric keypad function: (1) the user may deactivate the numeric keypad function by deactivating the Function key (e.g., by depressing the Function key), or (2) the user may deactivate the numeric keypad function by deactivating the Number Lock key (e.g., by depressing the Number Lock key). Following deactivation of the numeric keypad function, the input system 100 gives the user two options to reactivate the numeric keypad function: (1) the user may reactivate the numeric keypad function by reactivating the Function key (e.g., by depressing the Function key), or (2) the user may reactivate the numeric keypad function by reactivating the Number Lock key (e.g., by depressing the Number Lock key.) Thus, the input system 100 provides the user with multiple options for switching between physical key functions quickly and easily, which allows less physical keys to be used while providing the same functionality, thereby increasing compactness and portability of the input system 100.

Figure 12A:
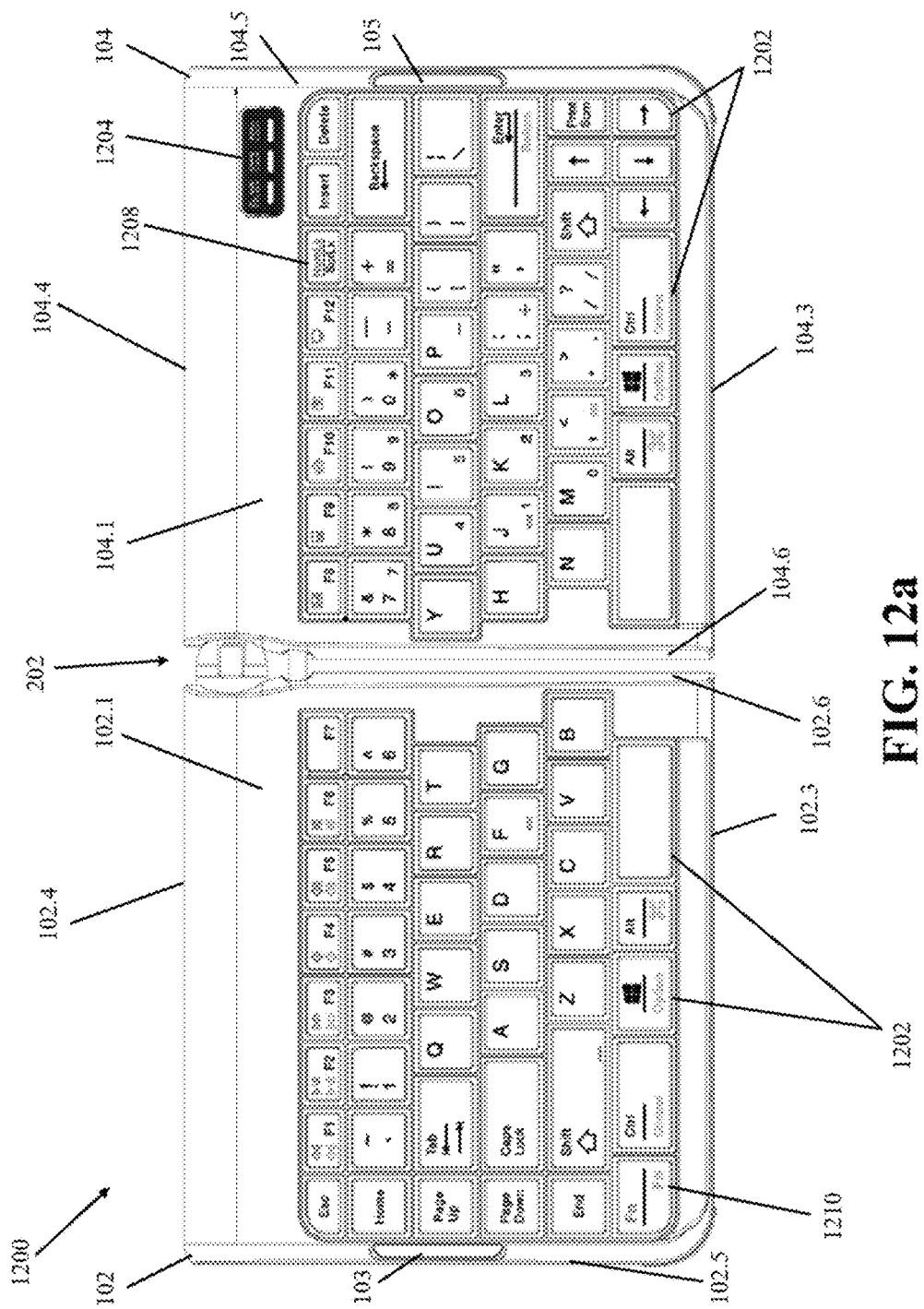
FIG. 12a is a top view illustrating an embodiment of a keyboard input system including a plurality of multi-function keys, a function activation key, and a function lock key.
Figure 12B:
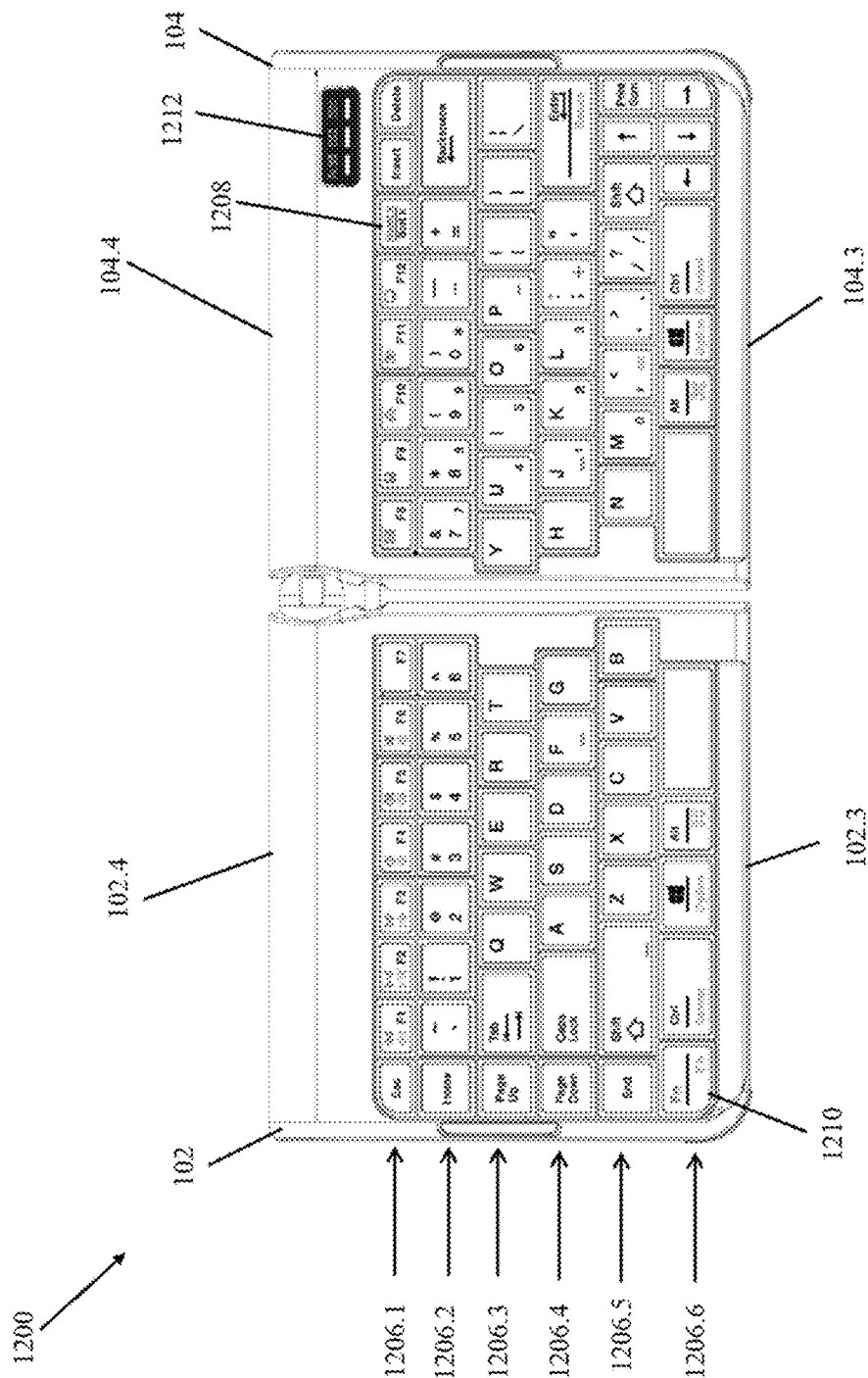

Referring now to FIGS. 12*a*, 12*b*, 13, and 14, an embodiment of an input system 1200 and method 1400 of operation is illustrated that provides for key expansion function(s) such as, for example, the key expansion function discussed above. The input system 1200 is substantially similar in structure and operation to the input system 100, described above, and thus similar components have the same reference numbers. However, the input system 1200 illustrated in FIGS. 12*a* and 12*b* provides a specific embodiment that includes a particular key layout having multi-function keys, and is provided to illustrate an example of a novel input system and method for providing multiple functions on an input system. Thus, while a particular key layout having a plurality of multi-function keys is illustrated and described below, one of skill in the art in possession of the present disclosure will recognize that different key layouts having different multi-function keys that are configured to operate in different function modes than those discussed below will fall within the scope of the present disclosure. Furthermore, while the input system and method for providing multiple functions on an input system are illustrated and described below as being incorporated on the adjustable ergonomic keyboard system described herein, one of skill in the art in possession of the present disclosure will recognize that the systems and methods discussed below will be equally advantageous to conventional keyboard input systems (e.g., non-ergonomic keyboard input systems, conventional ergonomic keyboard input systems, and/or other keyboard input systems known in the art), and thus the application of the teachings discussed below to such conventional systems will fall within the scope of the present disclosure as well.

Referring now to FIGS. 12*a* and 12*b*, the input system 1200 includes a plurality of input devices 1202, which may be the input devices 102.7 and 104.7 that are discussed above with reference to the input system 100. The input devices 1202 are illustrated as a plurality of physical keys that are located on the first base portion 102 and the second base portion 104, respectively, and are referred to henceforth as "keys". However, one of skill in the art in possession of the present disclosure will recognize that the keys discussed below may be the other inputs devices disclosed herein while remaining within the scope of the present disclosure. A function activation key indicator 1204 is located on the second base portion 104 between the rear edge 104.4 and the plurality of keys 1202, and in some embodiments may include lights (e.g. Light Emitting Devices (LEDs)), a display (e.g., a Liquid Crystal Display (LCD)), and/or a variety of other indicators known in the art. The plurality of keys 1202 are located on the top surfaces 102.1 and 104.1 of the first base portion 102 and the second base portion 104, respectively, in a plurality of adjacent key rows 1206.1, 1206.2, 1206.3, 1206.4, 1206.5, and 1206.6, illustrated in FIG. 12*b*.

In the illustrated embodiment, the key row 1206.1 includes function keys (e.g., the F1-F12 keys), a system key (e.g., the Esc key), enter/editing keys (e.g., the Insert key and the Delete key), and a function lock key 1208 (e.g., the NumLk/ScrLk key). In the illustrated embodiment, the key row 1206.2 includes a navigation key (e.g., the Home key), an enter/editing key (e.g., the Backspace key), and character keys (e.g., the number keys, arithmetic keys, and punctuation key between the Home key and the Backspace key). In the illustrated embodiment, the key row 1206.3 includes navigation keys (e.g., the Page Up key and the Tab key) and character keys (e.g., the letter keys and punctuation keys to the right of the Tab key in FIG. 12*b*). In the illustrated embodiment, the key row 1206.4 includes a navigation key (e.g., the Page Down key), a function lock key (e.g., the Caps Lock key), an enter/editing key (e.g., the Enter key), and character keys (e.g., the letter keys and punctuation keys between the Caps Lock key and the Enter key). In the illustrated embodiment, the key row 1206.5 includes navigation keys (e.g., the End key and the Arrow Up key), a system key (e.g., the Print Scrn key), modifier keys (e.g., the Shift keys), and character keys (e.g., the letter keys and punctuation keys between the Shift keys). In the illustrated embodiment, the key row 1206.6 includes a function activation key 1210 (e.g., the Fn key), modifier keys (e.g., the Ctrl keys and the Alt keys), system keys (e.g., the Option keys), navigation keys (e.g., the Arrow Left key, the Arrow Up key, and the Arrow Right key), and character keys (e.g., the Spacebar keys).

In the illustrated embodiment, the key rows 1206.2, 1206.3, 1206.4, and 1206.5 include number keys, letter keys, and punctuation keys that are multi-function keys that are configured to provide a portion of the complete set of character keys that are provided on the input system 1200 in a first function mode, while being configured to provide a numeric keypad in a second function mode. Specifically, a portion of the key row 1206.2 on the second base portion 104 includes the following multi-function keys (identified by "(input provided in the first function mode)/(input provided in the second function mode)"): a "7/7" key, an "8/8" key, a "9/9" key, and a "0/*" key. Similarly, a portion of the key row 1206.3 on the second base portion 104 includes the following multi-function keys: a "U/4" key, an "I/5" key, a "O/6" key, and a "P/−" key. Similarly, a portion of the key row 1206.4 on the second base portion 104 includes the following multi-function keys: a "J/1" key, an "K/2" key, a "L/3" key, and a ";/+" key. Similarly a portion of the key row 1206.5 on the second base portion 104 includes the following multi-function keys: a "M/0" key, an ",/=" key, a "./." key, and a "///" key.

As can be seen in FIG. 12*b*, the function lock key 1208 (e.g., the NumLk/ScrLk key) is included in the portion of the key row 1206.1 that is located on the second base portion 104 between the rear edge 104.4 of the second base portion 104 and the portions of the key rows 1206.2, 1206.3, 1206.4, and 1206.5 that are located on the second base portion 104 and that include the multi-function keys discussed above that provide the portion of the complete set of character keys in the first function mode and that provide the numeric keypad in the second function mode. As can also be seen in FIG. 12b, the function activation key 1210 (e.g., the Fn key) is included in the portion of the key row 1206.6 that is located on the first base portion 102 between the front edge 102.3 of the first base portion 102 and the portions of the key rows 1206.2, 1206.3, 1206.4, and 1206.5 that are located on the first base portion 102. As discussed above, while a specific embodiment of the input device 1200 has been provided that includes a physical keys in a particular keyboard layout, a variety of keying surfaces and devices in a variety of different layouts will benefit from the teachings of the present disclosure and are envisioned as falling within its scope.

As discussed in further detail below with regard to the illustrated embodiment, the positioning of the function lock key 1208 (i.e., adjacent a rear right corner of the input system 1200) may make it difficult for some users to quickly change between the function modes available to the multi-function keys. However, the systems and methods of the present disclosure provide a novel function switching mechanism that takes advantage of the positioning of the function activation key 1210 (i.e., adjacent a front left corner of the input system 1200) to provide for the changing between the function modes available to the multi-function keys, which experimental embodiments have found provides for users to more easier and quickly change between those function modes relative to conventional methods that require engagement of the function lock key 1208. Furthermore, other positionings of function lock keys and function activation keys will benefit from the teachings of the present disclosure and are envisioned as falling within its scope.

Figure 13:
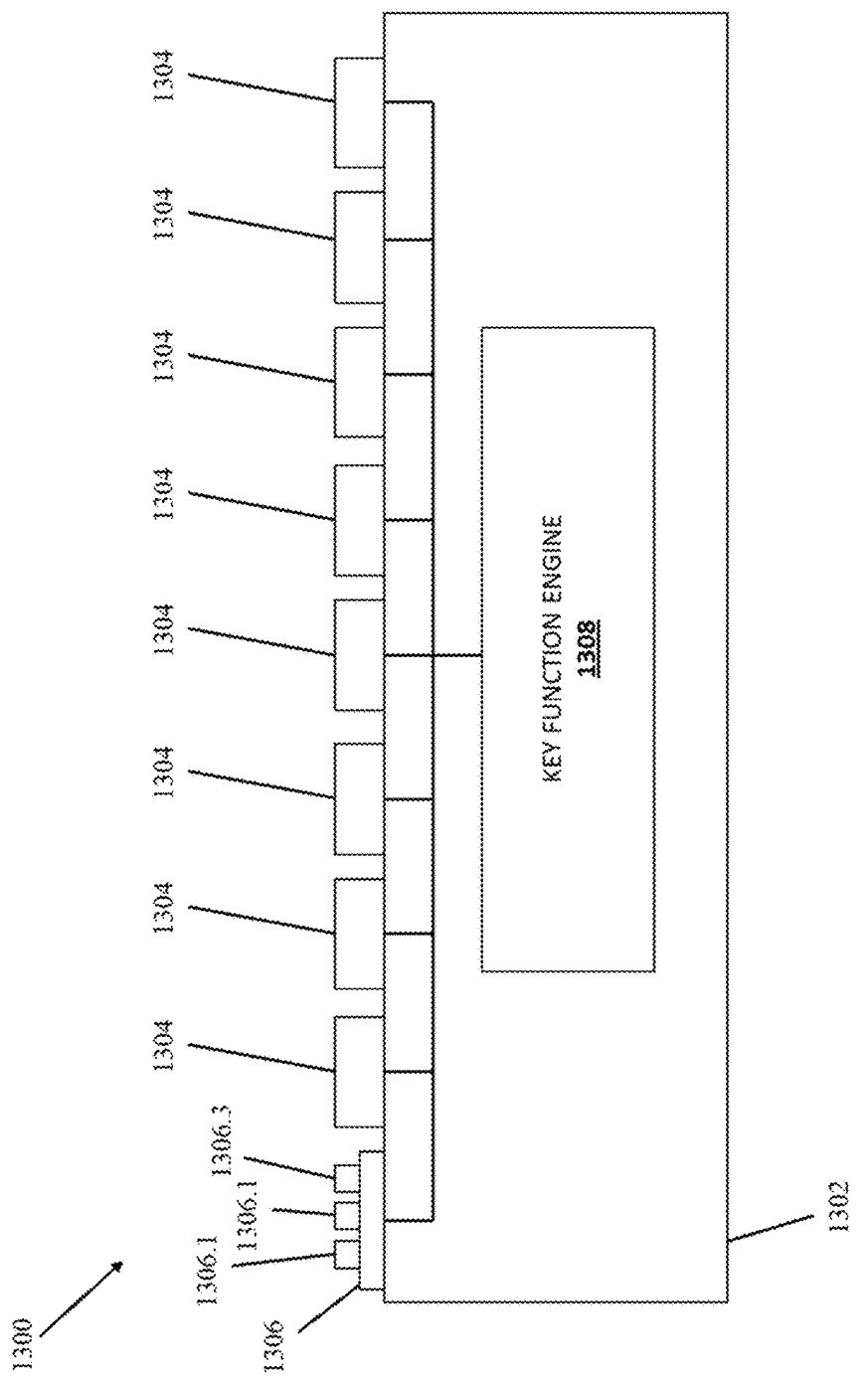
FIG. 13 is a schematic view illustrating an embodiment of the keyboard input system of FIGS. 12a and 12b.

Referring now to FIG. 13, an embodiment of an input system 1300 is illustrated that may be the input system 1200 discussed above with reference to FIGS. 12a and 12b. The input system 1300 includes a base 1302, which may include the first base portion 102 and/or the second base portion 104 discussed above, that includes a plurality of keys 1304, which may be the input devices 102.7, 104.7, and/or 1202 discussed above. The input system 1300 also includes a function activation key indicator 1306, which may be the function activation key indicator 1204 discussed above, and that may include a plurality of indicator members 1306.1 (e.g., LEDs, an LCD, etc.) A key function engine 1308 is provided in the base 1302 and coupled to each of the keys 1304 and to the function activation key indicator 1306. In some embodiments, the input system 1300 may include a processing system that is coupled to a memory that includes instructions that, when executed by the processing system, cause the processing system to provide the key function engine 1308 that is configured to provide the functionality of the key function engines discussed below. However, other combinations of hardware and/or software known in the art may be used to provide the functionality of the key function engine 1308 discussed below. Furthermore, while the key function engine 1308 is illustrated and described as included in the base 1302 of the input system 1300 (or provided by a processing system and memory system that is included in the base 1302 of the input system 1300), in other embodiments, the key function engine 1308 may be provided by a device that is coupled to the input system 1300 (e.g., by a computing system that is coupled to the input system 1300 and that includes a processing system and memory system that provide the key function engine 1308 similarly as discussed above.)

Figure 14:
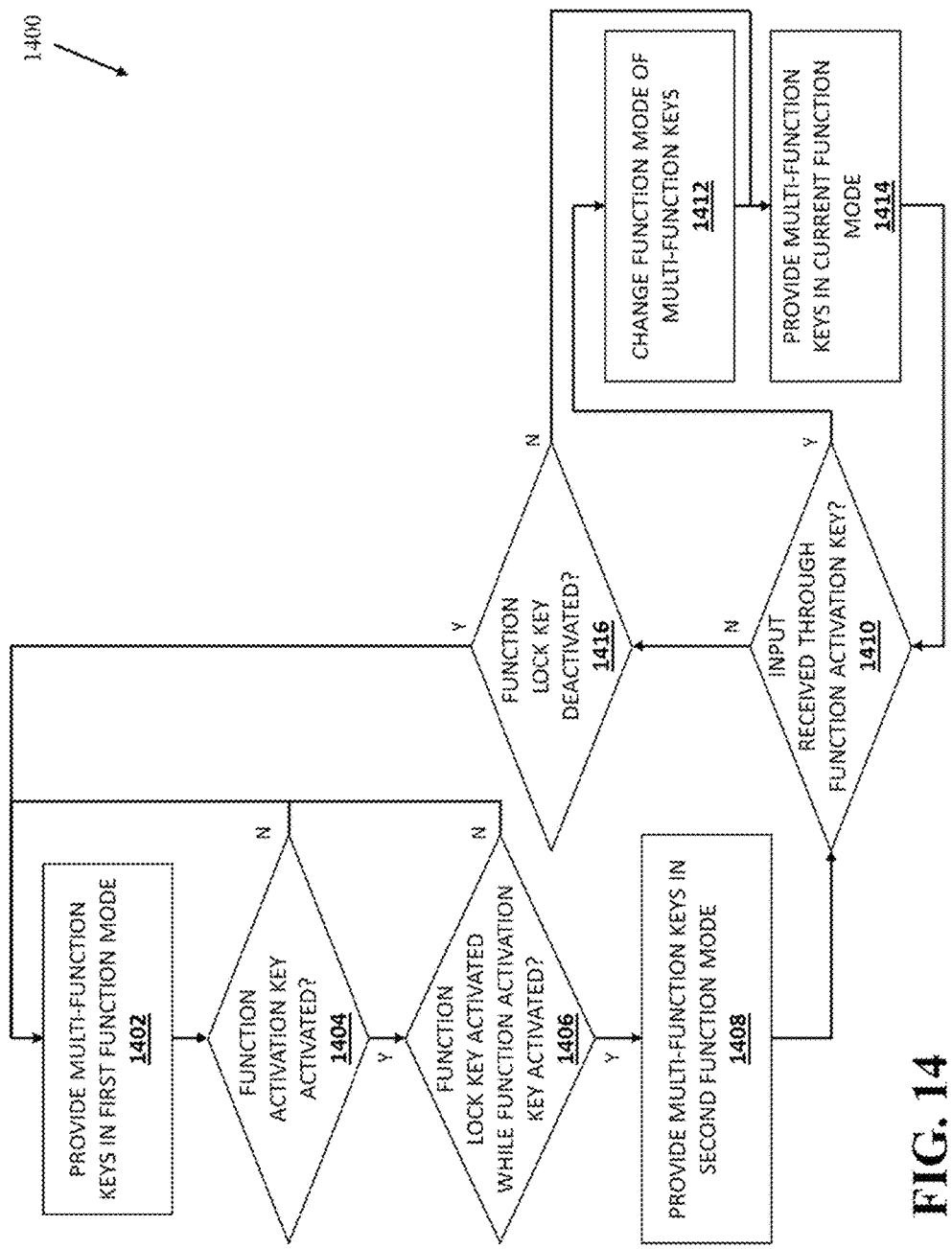
FIG. 14 is a flow chart illustrating an embodiment of a method for providing multiple functions on the keyboard input system of FIGS. 12a, 12b, and/or 13.

Referring now to FIG. 14, an embodiment of a method 1400 for providing multiple functions on an input system is illustrated. In the embodiments discussed below, the input system 1200, discussed above with reference to FIGS. 12a and 12b, is provided that includes features of the input system 1300, discussed above with reference to FIG. 13. However, one of skill in the art in possession of the present disclosure will recognize that the method 1400 will provide benefits for a wide variety of inputs systems that will fall within the scope of the present disclosure. Thus, while the method 1400 discussed below is directed to the input systems 1200 and 1300 discussed above that include a plurality of multi-function keys that operate in two functions modes (a character function mode and a numeric keypad function mode), other input systems that include more or fewer multi-function keys (e.g., as few as one multi-function key), that provide multi-function keys that are configured to perform different functions than the character and numeric keypad functions, and/or a variety of other input systems with multi-function key(s) known in the art will benefit from the method 1400 and fall within the scope of the present disclosure.

The method 1400 begins at block 1402 where the multi-function keys are provided in a first function mode. In an embodiment, the key function engine 1308 operates to provide the multi-function keys on the input system 1200 in a first function mode in which the multi-function keys operate to provide a portion of the complete set of character keys that are provided on the input system 1200. For example, when engaged by a user in the first function mode, the "7/7" key provides a "7", the "8/8" key provides an "8", the "9/9" key provides a "9", the "0/*" key provides a "0", the "U/4" key provides a "U", the "I/5" key provides an "I", the "O/6" key provides an "O", the "P/−" key provides a "P", the "J/1" key provides a "J", the "K/2" key provides a "K", the "L/3" key provides an "L", the ";/+" key provides a ";", the "M/0" key provides an "M", the ",/=" key provides a ",", the "./." key provides a ".", and the "///" key provides a "/". Thus, in the illustrated example, a user may use the input system 1200 with the multi-function keys in the first function mode to utilize the complete set of character keys on the input system 1200 to provide the inputs discussed above to a computing device.

The method 1400 then proceeds to decision block 1404 where it is determined whether the function activation key is activated. In an embodiment of decision block 1404, the key function engine 1308 determines whether the function activation key 1210 is activated. For example, engagement of the function activation key 1210 by a user may "activate" the function activation key 1210 by setting a bit in a register, triggering a switch, and/or performing a variety of other activation actions known in the art, and at decision block 1404, the key function engine 1308 may operate to check the register, determine the state of the switch, and/or otherwise determine whether the function activation key 1210 has been activated. In some embodiments, the key function engine 1308 may operate to provide a first indication from the function activation key indicator 1204 in response to the function activation key 1210 being activated. For example, in embodiments where the function activation key indicator 1204 includes LEDs, the key function engine 1308 may cause function activation key indicator 1204 to emit a blue light in response to determining that the function activation key 1210 is activated. As such, the first indication from the function activation key indicator 1204 may indicate to a user that the function activation key 1210 is activated. In some embodiments of the method 1400, the function activation key 1210 may be activated during the method 1400, while in other embodiments of the method 1400, the function activation key 1210 may have been activated in a previous iteration of the method 1400. If at decision block 1404, the key function engine 1308 determines that the function activation key 1210 is not activated, the method 1400 returns to block 1402 and the multi-function keys continue to be provided in the first function mode.

If at decision block 1404, the key function engine 1308 determines that the function activation key 1210 is activated, the method 1400 then proceeds to decision block 1406 where it is determined whether the function lock key is activated while the function activation key is activated. In an embodiment of decision block 1406, the key function engine 1308 determines whether the function lock key 1208 is activated. For example, engagement of the function lock key 1208 by a user may "activate" the function lock key 1208 by setting a bit in a register, triggering a switch, and/or performing a variety of other activation actions known in the art, and at decision block 1406, the key function engine 1308 may operate to check the register, determine the state of the switch, and/or otherwise determine whether the function lock key 1208 has been activated. In some embodiments, the key function engine 1308 may operate to provide a second indication from the function activation key indicator 1204 in response to the function lock key 1208 being activated while the function activation key 1210 is activated. For example, in embodiments where the function activation key indicator 1204 includes LEDs, the key function engine 1308 may cause function activation key indicator 1204 to emit a white light in response to determining that the function lock key 1210 has been activated while the function activation key 1210 is activated. As such, the second indication from the function activation key indicator 1204 may indicate to a user that the function lock key 1208 is activated. If at decision block 1406, the key function engine 1308 determines that the function lock key 1208 has not been activated while the function activation key 1210 is activated, the method 1400 returns to block 1402 and the multi-function keys continue to be provided in the first function mode.

If at decision block 1406, the key function engine 1308 determines that the function lock key 1208 is activated while the function activation key 1210 is activated, the method 1400 then proceeds to block 1408 where multi-function keys are provided in a second function mode. In an embodiment of block 1408, the key function engine 1308 operates to provide the multi-function keys on the input system 1200 in a second function mode in which the multi-function keys operate to provide a numeric keypad. For example, when engaged by a user in the second function mode, the "7/7" key provides a "7", the "8/8" key provides an "8", the "9/9" key provides a "9", the "0/*" key provides a "k", the "U/4" key provides a "4", the "I/5" key provides a "5", the "O/6" key provides a "6", the "P/−" key provides a "−", the "J/1" key provides a "1", the "K/2" key provides a "2", the "L/3" key provides a "3", the ";/+" key provides a "+", the "M/0" key provides a "0", the ",/=" key provides a "=", the "./." key provides a ".", and the "///" key provides a "/". Thus, in the illustrated example, a user may use the input system 1200 with the multi-function keys in the second function mode to utilize a numeric keypad on the input system 1200 to provide the inputs discussed above to a computing device.

The method 1400 then proceeds to decision block 1410 where it is determined whether an input is received through the function activation key. In an embodiment of decision block 1410, the key function engine 1308 determines whether an input is received through the function activation key 1210. In an embodiment, following the activation of the function lock key 1208 while the function activation key 1210 is activated, the key function engine 1308 may operate with the function activation key 1210 such that engagement of the function activation key 1210 by a user operates to provide an input that is used in the method 1400 to switch between function modes for the multi-function keys, as discussed below. These operations may be considered "activation" and "deactivation" of the function activation key 1210, a suspension of "deactivation" of the function activation key 1210 such that inputs provide for disclosed switching of function modes, or any other characterizations that provide for the functionality discussed below.

Thus, at decision block 1410, the key function engine 1308 determines whether an input has been received as a result of a user engaging the function activation key 1210. In some embodiments, the key function engine 1308 may operate to provide a third indication from the function activation key indicator 1204 in response to determining that an input has been received through the function activation key 1210 at decision block 1410 following the activation of the function lock key 1208. For example, in embodiments where the function activation key indicator 1204 includes LEDs, the key function engine 1308 may cause function activation key indicator 1204 to emit an orange light in response to determining that an input has been received through the function activation key 1210 at decision block 1410 following the activation of the function lock key 1208 at decision block 1406. As such, the third indication from the function activation key indicator 1204 may indicate to a user that the function lock key 1208 is activated but the function activation key 1210 is "deactivated", "off", or any other characterization that results in the multi-function keys being provided in the first function mode as discussed below.

If at decision block 1410, the key function engine 1308 determines that an input has been received through the function activation key 1210, the method 1400 proceed to block 1412 where the function mode of the multi-function keys is changed. In an embodiment of block 1412 where the input is received through the function activation key 1210 at decision block 1410 following the provision of the multi-function keys in the second function mode at block 1408, the key function engine 1308 operates to change the multi-function keys on the input system 1200 from the second function mode in which the multi-function keys operate to provide the numeric keypad, discussed in detail above, to the first function mode in which the multi-function keys operate to provide a portion of the complete set of character keys that are provided on the input system 1200, also discussed in detail above. The method 1400 then proceeds to block 1414 where the multi-function keys are provided in the "current" function mode, which is the function mode to which the multi-function keys were changed in block 1412 when block 1414 follows block 1412. Thus, in this embodiment of block 1414, the key function engine 1308 operates to provide the multi-function keys in the current (first) function mode, which is the function mode to which they were changed at block 1412 and in which they operate to provide a portion of the complete set of character keys that are provided on the input system 1200.

The method 1400 then returns to decision block 1410 where it is again determined whether an input is received through the function activation key. Similarly as discussed above, the key function engine 1308 determines whether an input is received through the function activation key 1210. In some embodiments, the key function engine 1308 may operate to provide the second indication from the function activation key indicator 1204, discussed above, in response to determining that an input has been received through the function activation key 1210 at decision block 1410 while the function lock key 1208 is activated and subsequent to receiving an input through the function activation key 1210 that put the function activation key 1210 into a "deactivated", "off", or other mode characterization in the multi-function keys were provided in the first function mode as discussed below. For example, in embodiments where the function activation key indicator 1204 includes LEDs, the key function engine 1308 may cause function activation key indicator 1204 to emit a blue light in response to determining that an input has been received through the function activation key 1210 at decision block 1410 while the function lock key 1208 is activated and subsequent to receiving an input through the function activation key 1210 that put the function activation key 1210 into a "deactivated", "off", or other mode characterization in the multi-function keys were provided in the first function mode as discussed below. As such, the second indication from the function activation key indicator 1204 may indicate to a user that the function lock key 1208 is activated and the function activation key 1210 is now "activated", "on" or any other characterization that results in the multi-function keys being provided in the second function mode, as discussed below.

If at decision block 1410, the key function engine 1308 determines that an input has been received through the function activation key 1210, the method 1400 again proceeds to block 1412 where the function mode of the multi-function keys is changed. In an embodiment of block 1412 where the input is received through the function activation key 1210 at decision block 1410 following the changing of the function mode of the multi-function keys at block 1412 to the first function mode (as discussed above) and the provision of the multi-function keys in that changed ("current") mode at block 1414, the key function engine 1308 operates to change the multi-function keys on the input system 1200 from the first function mode in which the multi-function keys operate to provide a portion of the complete set of character keys that are provided on the input system 1200, discussed in detail above, to the first function mode in which the multi-function keys operate to provide a numeric keypad, also discussed in detail above. The method 1400 then proceeds back to block 1414 where the multi-function keys are provided in the "current" function mode, which is the function mode to which the multi-function keys were changed to in block 1412 when block 1414 follows block 1412. Thus, in this embodiment of block 1414, the key function engine 1308 operates to provide the multi-function keys in the current (second) function mode, which is the function mode to which they were changed at block 1412 and in which they operate to provide a numeric keypad.

Thus, following the activation of the function lock key 1208 while the function activation key 1210 is activated, a user may change the function mode of the multi-function keys on the input system 1200 between the first function mode and the second function mode simply by providing an input to the function activation key 1210. In embodiments such as that illustrated in FIGS. 12a and 12b in which the input system 1200 includes the function activation key 1210 in the key row 1206f that is located on the keyboard between front edge and the other key rows 1206a-e, and includes the function lock key 1208 in the key row 1206a that is located on the keyboard between rear edge and the other key rows 1206b-f; the ability to use the more conveniently positioned function activation key 1210 as discussed above has been determined in experimental embodiments to provide for easier and quicker changing between function modes than would traditionally be provided using the function lock key 1208.

If at decision block 1410, the key function engine 1308 determines that no input has been received through the function activation key 1210, the method 100 proceeds to decision block 1416 where it is determined whether the function lock key is has been deactivated. In an embodiment, engagement by a user of the function lock key 1208 subsequent to its activation (e.g., at decision block 1406) may "deactivate" the function lock key 1208 by clearing a bit from a register, triggering a switch, and/or performing a variety of other deactivation actions known in the art, and at decision block 1416, the key function engine 1308 may operate to check the register, determine the state of the switch, and/or otherwise determine whether the function lock key 1208 has been deactivated. If at decision block 1416, the key function engine 1308 determines that the function lock key 1208 is not deactivated, the method 1400 proceeds to block 1414 where the multi-function keys are provided in the "current" function mode, which is the function mode to which the multi-function keys were in following decision block 1410 when block 1414 follows decision block 1416.

Thus, in this embodiment of block 1414, the key function engine 1308 operates to provide the multi-function keys in the current (first or second) function mode that depends on how the method 1400 reached block 1414. For example, that current function mode may be the second function mode when the method 1400 proceeds from block 1408, to decision block 1410, to decision block 1416, and then to block 1414. In another example, that current function mode may be the second function mode when the function mode was changed to the second function mode at block 1412 and the method 1400 then proceeded to block 1414, decision block 1410, decision block 1416, and then to block 1414. In yet another example, that current function mode may be the first function mode when the function mode was changed to the first function mode at block 1412 and the method 1400 then proceeded to block 1414, decision block 1410, decision block 1416, and then to block 1414. As such, the multi-function keys will remain in a given function mode as long as no input is received through the function activation key 1210 and the function lock key 1208 is not deactivated.

If at decision block 1416, the key function engine 1308 determines that the function lock key 1208 is deactivated, the method 1400 proceeds back to block 1402 where the multi-function keys are provided in the first function mode. As such, in embodiments where the multi-function keys are configured to operate in a first function mode in which they provide a portion of the complete set of character keys that are provided on the input system 1200 and a second function mode in which they provide a numeric keypad, the method 1400 provides for the following operation: The multi-function keys may provide character keys until the activation of the function lock key 1208 while the function activation key 1210 is activated switches the function mode of the multi-function keys such that they provide the numeric keypad. Subsequent inputs to the function activation key then operate to change the function mode of the multi-function keys between the numeric keypad and the character keys until the function lock key 1208 is deactivated such that the multi-function keys provide the character keys. As such, the user is given two options to change from the second function mode to the first function mode: provide an input to the function activation key 1210, or deactivate the function lock key 1208.

Thus, systems and methods have been described that provide for the switching between function modes of multi-function keys on an input device in a manner that is quicker and easier than is provided on conventional input systems and that provides multiple different key options for doing so. The systems and methods of the present disclosure allow for the provision of more compact input systems that may require inconvenient placement of at least some keys (e.g., the function activation key and/or function lock key discussed above) without complicating the function switching process for the user. One of skill in the art in possession of the present disclosure will recognize that that an input system may include any number of function modes (e.g., greater than the two function modes discussed herein) that may be switched through using the teachings of the present disclosure, and that the key used to provide such switching (e.g., the function activation key discussed above) may be conveniently placed on other areas of the input system if those areas are found to be more convenient for at least some users.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein

What is claimed is:

1. An input system, comprising:
   at least one base portion;
   a plurality of multi-function keys that are located on the at least one base portion;
   a function lock key that is located on the at least one base portion;
   a function activation key that is located on the at least one base portion and different from the function lock key; and
   a key function engine that is coupled to the plurality of multi-function keys, the function lock key, and the function activation key, wherein the key function engine is configured to:
   prior to receiving a first input through the function activation key, provide the plurality of multi-function keys in a first function mode;
   receive the first input of the function activation key;
   after receiving the first input of the function activation key, continue to provide the plurality of multi-function keys in the first function mode;
   change the function mode of the plurality of multi-function keys from the first function mode to a second function mode in response to receiving a second input of the function lock key following the receiving of the first input of the function activation key; and
   subsequent to the receiving of the second input of the function lock key, change the function mode of the plurality of multi-function keys between the second function mode and the first function mode in response to each subsequent input that is received through the function activation key.

2. The input system of claim 1, wherein at least one of the plurality of multi-function keys is configured to provide a letter in the first function mode and a number in the second function mode.

3. The input system of claim 1, wherein the plurality of multi-function keys are configured to provide a portion of a set of character keys in the first function mode, and wherein the plurality of multi-function keys are configured to provide a numeric keypad in the second function mode.

4. The input system of claim 1, further comprising:
   a function activation key indicator that is coupled to the key function engine, wherein the key function engine is configured to provide a first indication from the function activation key indicator in response to receiving the first input through the function activation key, and wherein the key function engine is configured to provide a second indication from the function activation key indicator in response to receiving the second input through the function lock key subsequent to receiving the first input through the function activation key.

5. The input system of claim 1, wherein the at least one base portion includes a first base portion and a second base portion, and wherein the function activation key is located on the first base portion and the plurality of multi-function keys and the function lock key are located on the second base portion.

6. The input system of claim 1, wherein the at least one base portion includes a front edge and a rear edge that is located opposite the at least one base portion from the front edge, and wherein the function lock key is included in a key row that is located on the at least one base portion between the rear edge and a plurality of key rows that include the plurality of multi-function keys.

7. The input system of claim 1, wherein the key function engine is further configured to:
   provide the plurality of multi-function keys in the second function mode; and
   change the function mode of the plurality of multi-function keys from the second function mode to the first function mode in response to receiving a third input through the function lock key.

8. A keyboard, comprising:
   a keyboard base including a plurality of physical keys;
   a key function engine that is included in the keyboard base and that is coupled to
   the plurality of physical keys, wherein the key function engine is configured to:
   prior to receiving a first input of a function activation physical key of the plurality of physical keys, provide at least one multi-function physical key of the plurality of physical keys in a first function mode;
   receive the first input of the function activation key;
   after receiving the first input of the function activation key, continue to provide the at least one multi-function physical key of the plurality of multi-function keys in the first function mode;
   change the function mode of the at least one multi-function physical key from the first function mode to a second function mode in response to receiving a second input of a function lock physical key of the plurality of physical keys, wherein the function activation physical key is different from the function lock physical key;
   following the receiving of the first input of the function activation physical key of the plurality of physical keys; and
   subsequent to the receiving of the second input of the function lock physical key, change the function mode of the at least one multi-function physical key between the second function mode and the first function mode in response to each subsequent input that is received of the function activation physical key.

9. The keyboard of claim 8, wherein the at least one multi-function physical key is configured to provide a letter in the first function mode and a number in the second function mode.

10. The keyboard of claim 9, wherein the at least one multi-function physical key includes a plurality of multi-function physical keys that are configured to provide a portion of a set of character keys in the first function mode, and a numeric keypad in the second function mode.

11. The keyboard of claim 10, wherein the key function engine is further configured to:
provide a first indication in response to receiving the first input through the function activation physical key, and provide a second indication in response to receiving the second input through the function lock physical key subsequent to receiving the first input through the function activation physical key.

12. The keyboard of claim 1, wherein the keyboard base includes a first keyboard segment and a second keyboard segment, and wherein the function activation physical key is located on the first keyboard segment and the at least one multi-function physical key and the function lock physical key are located on the second keyboard segment.

13. The keyboard of claim 12, wherein the keyboard base includes a front edge and a rear edge that is located opposite the keyboard base from the front edge, and wherein the function lock physical key is included in a key row that is located on the keyboard base between the rear edge and a plurality of key rows that include the at least one multi-function physical key.

14. The keyboard of claim 13, wherein the key function engine is further configured to:
provide the at least one multi-function physical key in the second function mode; and
change the function mode of the at least one multi-function physical key from the second function mode to the first function mode in response to receiving a third input through the function lock physical key.

15. A method for providing multiple functions on an input system, comprising:
prior to receiving a first input of a function activation physical key of the plurality of physical keys, provide at least one multi-function physical key of the plurality of physical keys in a first function mode;
receiving the first input of the function activation key;
after receiving the first input of the function activation key, continuing to provide the plurality of multi-function keys in the first function mode;
changing a function mode of the plurality of multi-function keys from the first function mode to a second function mode in response to receiving a second input of a function lock key on the keyboard following the receiving of the first input of the function activation key, wherein the function activation key is different from the function lock key; and
subsequent to the receiving of the second input of the function lock key, changing the function mode of the plurality of multi-function keys between the second function mode and the first function mode in response to each subsequent input that is received of the function activation key.

16. The method of claim 15, wherein at least one of the plurality of multi-function keys is configured to provide a letter in the first function mode and a number in the second function mode.

17. The method of claim 15, wherein the plurality of multi-function keys are configured to provide a portion of a set of character keys in the first function mode, and wherein the plurality of multi-function keys are configured to provide a numeric keypad in the second function mode.

18. The method of claim 17, further comprising:
providing a first indication in response to receiving the first input through the function activation key; and
providing a second indication in response to receiving the second input through the function lock key subsequent to receiving the first input through the function activation key.

19. The method of claim 17, wherein the keyboard includes a front edge and a rear edge that is located opposite the keyboard from the front edge, and wherein the function lock key is included in a key row that is located on the keyboard between the rear edge and a plurality of key rows that include the plurality of multi-function keys.

20. The method of claim 15, further comprising:
providing the plurality of multi-function keys in the second function mode; and
changing the function mode of the plurality of multi-function keys from the second function mode to the first function mode in response to receiving a third input through the function lock key.

* * * * *